United States Patent
Onodera et al.

(10) Patent No.: US 9,483,502 B2
(45) Date of Patent: Nov. 1, 2016

(54) COMPUTATIONAL PROCESSING DEVICE INCLUDING REQUEST HOLDING UNITS EACH PROVIDED FOR EACH TYPE OF COMMANDS, INFORMATION PROCESSING DEVICE INCLUDING REQUEST HOLDING UNITS EACH PROVIDED FOR EACH TYPE OF COMMANDS, AND METHOD OF CONTROLLING INFORMATION PROCESSING DEVICE

(71) Applicant: FUJITSU LIMITED, Kawasaki-shi, Kanagawa (JP)

(72) Inventors: Koichi Onodera, Kawasaki (JP); Shuji Yamamura, Yokohama (JP); Toru Hikichi, Inagi (JP)

(73) Assignee: FUJITSU LIMITED, Kawasaki (JP)

(*) Notice: Subject to any disclaimer, the term of this patent is extended or adjusted under 35 U.S.C. 154(b) by 404 days.

(21) Appl. No.: 13/918,108

(22) Filed: Jun. 14, 2013

(65) Prior Publication Data
US 2014/0046979 A1     Feb. 13, 2014

(30) Foreign Application Priority Data
Aug. 9, 2012   (JP) ................... 2012-177106

(51) Int. Cl.
*G06F 17/30*    (2006.01)
*G06F 13/00*    (2006.01)
*G06F 13/16*    (2006.01)

(52) U.S. Cl.
CPC ......... *G06F 17/30289* (2013.01); *G06F 13/16* (2013.01); *G06F 13/1605* (2013.01); *G06F 13/1621* (2013.01); *G06F 13/1626* (2013.01); *G06F 13/1642* (2013.01)

(58) Field of Classification Search
CPC ........... G06F 3/0601; G06F 17/30289; G06F 13/1605; G06F 13/1621; G06F 13/1626; G06F 13/1642
USPC ................................ 710/240, 241, 243, 244
See application file for complete search history.

(56) References Cited

U.S. PATENT DOCUMENTS

| | | | |
|---|---|---|---|
| 5,706,463 A * | 1/1998 | Ebrahim | G06F 12/0822 |
| | | | 711/120 |
| 6,088,772 A * | 7/2000 | Harriman | G06F 13/1631 |
| | | | 711/158 |

(Continued)

FOREIGN PATENT DOCUMENTS

| | | |
|---|---|---|
| JP | 8-278953 | 10/1996 |
| JP | 9-62564 | 3/1997 |

(Continued)

*Primary Examiner* — Scott A Waldron
(74) *Attorney, Agent, or Firm* — Staas & Halsey LLP

(57) ABSTRACT

A computational processing device includes: a computational-processor that outputs access requests to a storage device; a plurality of request-holding-units that respectively hold access requests output by the computational processor according to individual access types, the access types being types of access requests; an arbitration-unit that arbitrates access requests held in the plurality of request holding units; a buffer-unit that includes a plurality of entries that hold data; and a buffer-controller that causes one of the plurality of entries to hold data output by the storage device in response to an access request arbitrated by the arbitration unit, on the basis of a result of comparing, for each access type, a count value that counts, for each access type, the number of entries holding data from among the plurality of entries against a maximum value for the number of entries made to hold data for each access type.

19 Claims, 24 Drawing Sheets

(56) References Cited

U.S. PATENT DOCUMENTS

| | | | | |
|---|---|---|---|---|
| 6,138,176 | A * | 10/2000 | McDonald | G06F 3/061 710/241 |
| 6,505,268 | B1 * | 1/2003 | Schultz et al. | 711/4 |
| 6,529,948 | B1 * | 3/2003 | Bowman-Amuah | 709/217 |
| 6,973,563 | B1 * | 12/2005 | Sander | G06F 9/30054 712/239 |
| 7,603,672 | B1 * | 10/2009 | Andrighetti | G06F 9/30047 710/23 |
| 8,103,833 | B2 * | 1/2012 | Koren | G06F 12/0855 710/240 |
| 2002/0186711 | A1 | 12/2002 | Masuyama et al. | |
| 2004/0078532 | A1 | 4/2004 | Tremaine | |
| 2004/0153786 | A1 * | 8/2004 | Johnson et al. | 714/25 |
| 2010/0268892 | A1 * | 10/2010 | Luttrell | G06F 12/0862 711/137 |
| 2011/0131360 | A1 * | 6/2011 | Noeldner | G06F 12/00 710/308 |

FOREIGN PATENT DOCUMENTS

| | | |
|---|---|---|
| JP | 10-78942 | 3/1998 |
| JP | 2003-76671 | 3/2003 |
| JP | 2004-164607 | 6/2004 |

* cited by examiner

COMPUTATIONAL PROCESSING DEVICE
INCLUDING REQUEST HOLDING UNITS
EACH PROVIDED FOR EACH TYPE OF
COMMANDS, INFORMATION PROCESSING
DEVICE INCLUDING REQUEST HOLDING
UNITS EACH PROVIDED FOR EACH TYPE
OF COMMANDS, AND METHOD OF
CONTROLLING INFORMATION
PROCESSING DEVICE

CROSS-REFERENCE TO RELATED
APPLICATION

This application is based upon and claims the benefit of priority of the prior Japanese Patent Application No. 2012-177106, filed on Aug. 9, 2012, the entire contents of which are incorporated herein by reference.

FIELD

The embodiments discussed herein are related to a computational processing device, an information processing device, and a method of controlling an information processing device.

BACKGROUND

An information processing device such as a server includes a storage device such as main memory shared by multiple computational processing devices, and a buffer unit that holds data retrieved from the storage device, for example. In this type of information processing device, data areas inside the buffer unit are dynamically allocated according to the request source of an access request (see Japanese Laid-open Patent Publication No. 2004-164607, for example). Also proposed is a technique that allocates multiple domains, each having multiple nodes such as a central control device and memory, to each of multiple resources in a pool of shared resources (see Japanese Laid-open Patent Publication No. 2003-76671, for example).

Additionally proposed is an exclusive control device that allocates a computer or a group of computer to each of multiple data areas within a shared data device, and forbids simultaneous access to the shared data device from multiple computers (see Japanese Laid-open Patent Publication No. 08-278953, for example).

Modifying the proportion of data areas in a buffer unit where low-priority data is stored according to the usage efficiency of the buffer unit has been proposed (see Japanese Laid-open Patent Publication No. 09-62564, for example). A multi-processor system including a shared buffer that buffers primary storage data for individual processor groups that include multiple processor has been proposed (see Japanese Laid-open Patent Publication No. 10-78942, for example).

For example, in the case where a given data area is allocated in correspondence with the request source of an access request, an access request from a request source not allocated with that data area is aborted. In the case of allocating data areas to all request sources, the number of data areas allocable to each request source decreases, and thus there is an increase in the frequency at which an access request from a request source is aborted. Repeated aborts risk lowering the performance of an information processing device and a computational processing device.

In one aspect, an object of the embodiments is to lower the frequency at which an access request from a request source is aborted while reserving data areas in a buffer unit to all request sources, and to inhibit decreased performance of an information processing device and a computational processing device.

SUMMARY

According to an aspect of the invention, A computational processing device includes: a computational-processor that outputs access requests to a storage device; a plurality of request-holding-units that respectively hold access requests output by the computational processor according to individual access types, the access types being types of access requests; an arbitration-unit that arbitrates access requests held in the plurality of request holding units; a buffer-unit that includes a plurality of entries that hold data; and a buffer-controller that causes one of the plurality of entries to hold data output by the storage device in response to an access request arbitrated by the arbitration unit, on the basis of a result of comparing, for each access type, a count value that counts, for each access type, the number of entries holding data from among the plurality of entries against a maximum value for the number of entries made to hold data for each access type.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described using the drawings.

Figure 1:
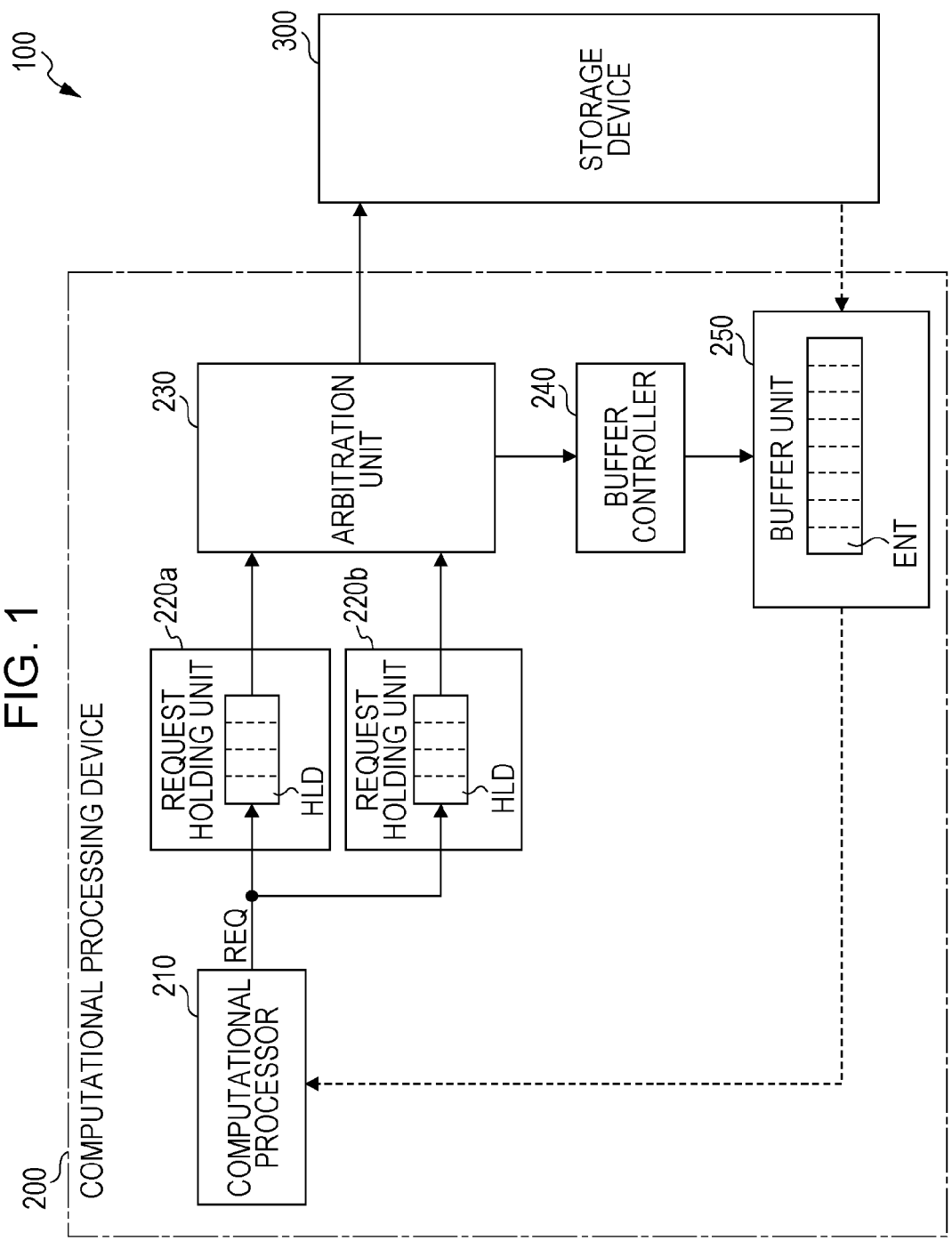
FIG. 1 illustrates an example of an information processing device and a computational processing device according to an embodiment.

FIG. 1 illustrates an example of an information processing device 100 and a computational processing device 200 according to an embodiment. The information processing device 100 includes a computational processing device 200 and a storage device 300. For example, the information processing device 100 is a computing device such as a server or personal computer, while the computational processing device 200 is a processor such as a central processing unit (CPU).

The storage device 300 is a memory module such as a dual in-line memory module (DIMM) mounted with multiple dynamic random access memory (DRAM) circuits, for example. The storage device 300 stores programs executed by a computational processor 210 of the computational processing device 200 and data processed by the computational processor 210. Note that the storage device 300 may also have a semiconductor memory chip or semiconductor memory core configuration.

The computational processing device 200 and the storage device 300 are mounted onto a printed circuit board, for example. Note that the computational processing device 200 may also be a processor chip or a processor core. In this case, the computational processing device 200 and the storage device 300 may also be mounted onto a single semiconductor chip.

The computational processing device 200 includes a computational processor 210, request holding units 220 (220a, 220b), an arbitration unit 230, a buffer controller 240, and a buffer unit 250. The computational processor 210 is a CPU core, for example, and outputs access requests REQ to the storage device 300. The access requests REQ potentially include input/output requests for data handled by the computational processor 210, such as load commands or store commands, and prefetch commands for a program executed by the computational processor 210, for example.

The request holding units 220a and 220b each include at least one holding area HLD that holds an access request REQ. Note that although FIG. 1 illustrates an example in which each of the request holding units 220a and 220b includes four holding areas HLD, the number of holding areas HLD is not limited to four. From among the access requests REQ output from the computational processor 210, the request holding unit 220a holds input/output requests in its holding areas HLD. From among the access requests REQ output from the computational processor 210, the request holding unit 220b holds prefetch commands in its holding areas HLD.

Input/output requests for data and prefetch commands for programs are examples of access types, which are types of access requests REQ. In other words, the computational processor 210 respectively outputs access requests REQ to the request holding units 220a and 220b according to access type, and the request holding units 220a and 220b hold access requests REQ according to access type.

The arbitration unit 230 arbitrates access requests REQ held in the request holding units 220a and 220b, and selects an access request REQ to output to the storage device 300. For example, the arbitration unit 230 uses a technique such as round-robin to successively select access requests REQ held in the request holding units 220a and 220b. The arbitration unit 230 then outputs an access request REQ to the storage device 300 on the basis of an entry ENT in the buffer unit 250 which holds data being reserved in correspondence with the access request REQ.

The buffer unit 250 includes multiple entries ENT that hold data retrieved from the storage device 300 on the basis of an access request REQ. In FIG. 1, the bold broken line indicates a data line on which data is transmitted. Note that although FIG. 1 illustrates an example in which the buffer unit 250 includes eight entries ENT, the number of entries ENT is not limited to eight.

In this embodiment, the maximum value for the number of entries ENT that hold data retrieved from the storage device 300 on the basis of an access request REQ is predetermined for each of the request holding units 220a and 220b. For example, in the case where the number of entries ENT is eight, a maximum of seven or less entries ENT may be allocated in correspondence with access requests REQ from the request holding units 220a and 220b, respectively.

The maximum value for the number of allocable entries ENT is set such that the sum of the maximum values for the number of allocable entries ENT corresponding to the other request holding units 220 excepting one request holding unit 220 is less than the total number of entries ENT. For example, in the case where there are eight entries ENT and the computational processing device 200 includes four request holding units 220, the sum of the maximum values for the number of allocable entries ENT corresponding to three of the request holding units 220 is set to be seven or less. Thus, an entry ENT corresponding to an access request REQ from one request holding unit 220 is reserved, even in the case where the maximum number of allocable entries ENT are reserved for the remaining request holding units 220 excepting that one request holding unit 220.

The buffer controller 240 respectively counts the number of entries ENT reserved for the request holding units 220a and 220b, and holds the results as count values. In the case where a count value corresponding to the request holding unit 220a or 220b is less than the maximum value for the number of allocable entries ENT, the buffer controller 240 reserves an entry ENT on the basis of a selection of an access request REQ from the corresponding request holding unit 220 by the arbitration unit 230. In the case where a count value corresponding to the request holding unit 220a or 220b is equal to or greater than the maximum value for the number of allocable entries ENT, the buffer controller 240 does not reserve an entry ENT, even if an access request REQ from the corresponding request holding unit 220 is selected by the arbitration unit 230.

In other words, for each access type, the buffer controller 240 compares the count value counted for that access type of entries ENT holding data from among the multiple entries ENT to the maximum value for the number of entries ENT made to hold data for that access type. On the basis of the comparison results, the buffer controller 240 then causes one of the entries ENT to hold data output by the storage device 300 in accordance with an access request REQ arbitrated by the arbitration unit 230.

Thus, at least one entry ENT is guaranteed to be reserved in each of the request holding units 220, even if access requests REQ are concentrating on a specific request holding unit 220. In other words, each request holding unit 220 is guaranteed to be able to receive access requests REQ at a given frequency. As a result, the performance of the computational processing device 200 and the information processing device 100 does not drop due to being unable to receive specific access requests REQ.

Figure 2:
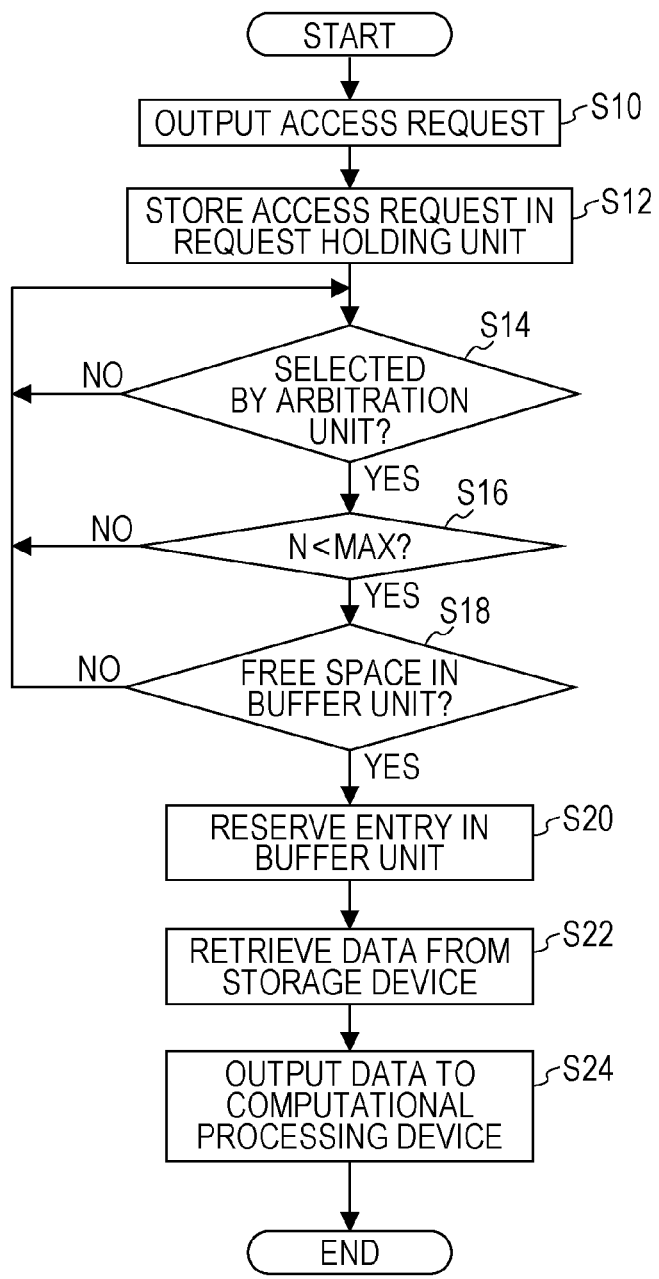
FIG. 2 illustrates exemplary operation of the information processing device and computational processing device illustrated in FIG. 1.

FIG. 2 illustrates exemplary operation of the information processing device 100 and computational processing device 200 illustrated in FIG. 1. That is, FIG. 2 illustrates an exemplary method of controlling the information processing device 100 and computational processing device 200. The flow illustrated in FIG. 2 is realized in hardware, for example. Note that FIG. 2 illustrates the operation for each individual access request REQ and the operation for each request holding unit 220.

First, in step S10, the computational processor 210 outputs an access request REQ to a corresponding request holding unit 220. In step S12, the request holding unit 220 stores the access request REQ in a holding area HLD. Note that the computational processor 210 outputs an access request REQ when a holding area HLD is free, and defers the output of an access request REQ when access requests REQ are being stored in all holding areas HLD, for example.

In step S14, the arbitration unit 230 selects one access request REQ held in the request holding unit 220. Note that the arbitration unit 230 selects an access request REQ held in the next request holding unit 220 in the case where an access request REQ is not being held in a holding area HLD of the request holding unit 220 selected by the arbitration unit 230.

In the case where an access request REQ is selected by the arbitration unit 230, in step S16 the buffer controller 240 compares the number N of entries ENT reserved for the request holding unit 220 holding the access request REQ to the maximum value MAX for the number of entries ENT allocable to that request holding unit 220. In the case where the reserved number N is the maximum value MAX, another entry ENT is not reserved, and thus the access request REQ is aborted, and the arbitration unit 230 selects another access request REQ. Herein, an abort designates the state of not transmitting the data corresponding to an access request REQ to the computational processor 210. When an access request REQ is aborted, the request holding unit 220 continues to hold the access request REQ without outputting the access request REQ to the storage device 300.

In the case where the reserved number N is less than the maximum value MAX, in step S18 the buffer controller 240 checks whether or not a free entry ENT (that is, an entry ENT that has not been reserved) exists. In the case where a free entry ENT does not exist, the access request REQ is aborted, and the arbitration unit 230 selects another access request REQ.

In the case where a free entry ENT does exist, in step S20 the buffer controller 240 reserves the entry ENT in order to store data retrieved from the storage device 300 in correspondence with the access request REQ selected by the arbitration unit 230. The reservation of the entry ENT causes the number N of entries ENT corresponding to the request holding unit 220 holding the selected access request REQ to increase by "1".

In step S22, the arbitration unit 230 outputs the access request REQ to the storage device 300 on the basis of the entry ENT reservation. The storage device 300 executes a retrieval operation on the basis of the access request REQ, and outputs data retrieved from a memory cell to the buffer unit 250. The buffer unit 250 stores the data output from the storage device 300 in the entry ENT that was reserved in step S20.

In step S24, the buffer unit 250 outputs the data stored in the entry ENT to the computational processor 210. As data is output from the entry ENT, the number N of entries ENT corresponding to the request holding unit 220 holding the selected access request REQ decreases by "1". Note that the access request REQ held in the request holding unit 220 is invalidated on the basis of the entry ENT reservation, or alternatively, invalidated on the basis of the output of data from the buffer unit 250 to the computational processor 210.

Thus, in the present embodiment, by setting a maximum number of allocable entries ENT for each of the request holding units 220a and 220b, at least one entry ENT is reserved for each of the request holding units 220a and 220b. Thus, the arbitration unit 230 is able to receive access requests REQ held in each of the request holding units 220a and 220b at a given frequency, and output the access requests REQ to the storage device 300. As a result, it is possible to lower the likelihood of a specific access request REQ being continually aborted compared to the related art, and lower the likelihood of the computational processor 210 hanging up due to such aborts compared to the related art. In other words, it is possible to inhibit decreased performance of the information processing device 100 and computational processing device 200 due to aborts.

Figure 3:
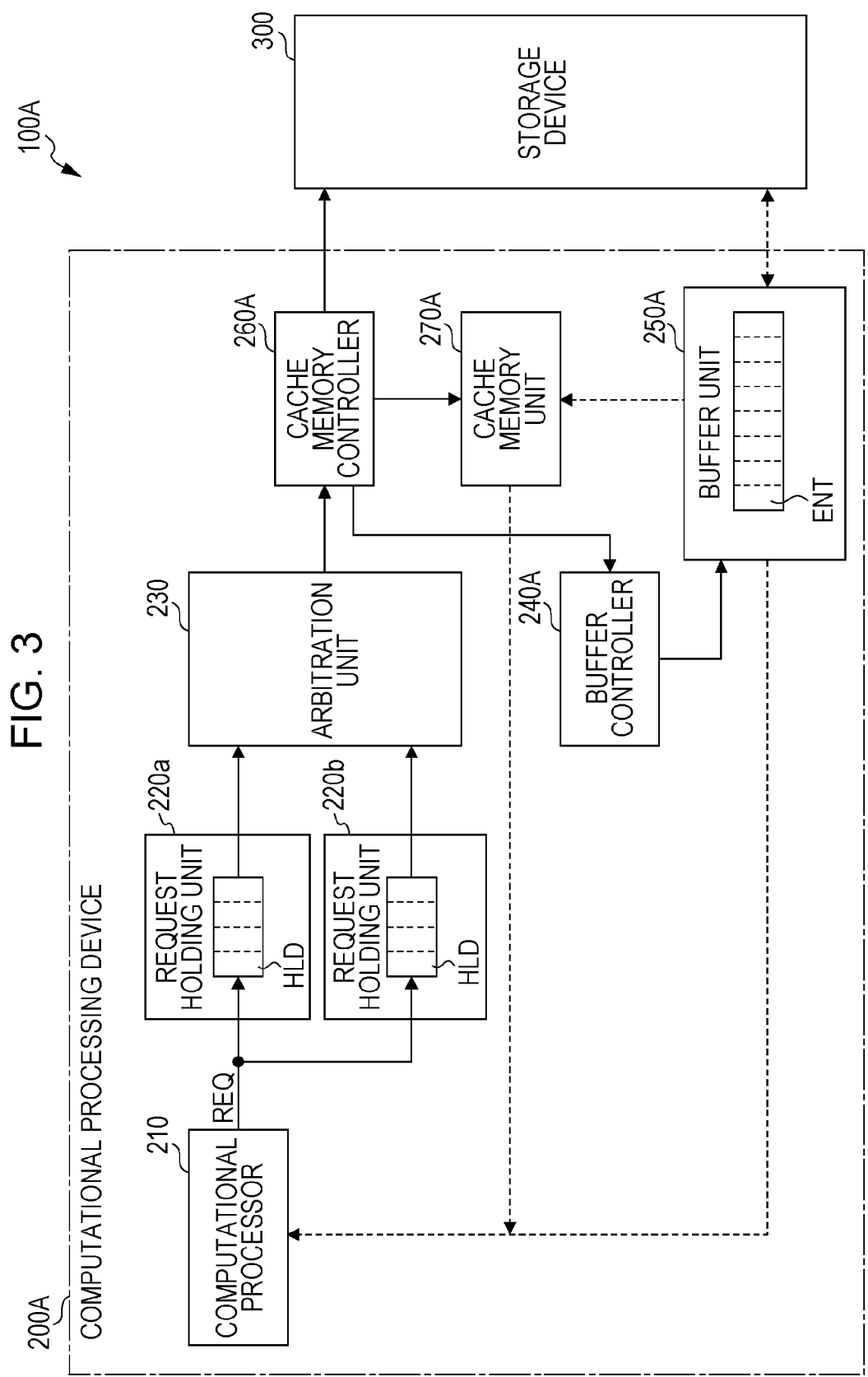
FIG. 3 illustrates an example of an information processing device and a computational processing device according to another embodiment.

FIG. 3 illustrates an example of an information processing device 100A and a computational processing device 200A according to another embodiment. Elements that are similar or identical to FIG. 1 are denoted with like signs, and detailed description of such elements will be reduced or omitted. In this embodiment, the computational processing device 200A includes a buffer controller 240A and a buffer unit 250A instead of the buffer controller 240 and the buffer unit 250 illustrated in FIG. 1. The computational processing device 200A also includes a cache memory controller 260A and a cache memory unit 270A in addition to the elements illustrated in FIG. 1. The rest of the configuration of the computational processing device 200A is similar to FIG. 1.

The cache memory controller 260A checks whether or not data corresponding to an access request REQ output from the arbitration unit 230 exists in the cache memory unit 270A. In the case where data corresponding to the access request REQ does exist in the cache memory unit 270A (a cache hit), the cache memory controller 260A retrieves data from the cache memory unit 270A without outputting the access request REQ to the storage device 300. The data retrieved from the cache memory unit 270A is output to the computational processor 210.

In the case where data corresponding to the access request REQ does not exist in the cache memory unit 270A (a cache miss), the cache memory controller 260A requests the buffer controller 240A to reserve an entry ENT. Note that the buffer controller 240A does not reserve an entry ENT in the buffer unit 250A in the case of a cache hit. Besides reserving an entry ENT at the time of a cache miss and not reserving an entry ENT at the time of a cache hit, the functionality of the buffer controller 240A is similar to the buffer controller 240 illustrated in FIG. 1.

In the case where data corresponding to an access request REQ is not being stored in the cache memory unit 270A (a cache miss), the cache memory controller 260A outputs an access request REQ to the storage device 300 on the basis of an entry ENT being reserved in the buffer unit 250A. In the case where an entry ENT is not reserved, the access request REQ is aborted without outputting the access request REQ to the storage device 300.

The buffer unit 250A includes functionality to output data stored in an entry ENT to the cache memory unit 270A, in addition to the functionality of the buffer unit 250 illustrated in FIG. 1. In other words, in the case of a cache miss, data retrieved from the storage device 300 and stored in an entry ENT is output to the computational processor 210, while also being stored in the cache memory unit 270A.

Figure 4:
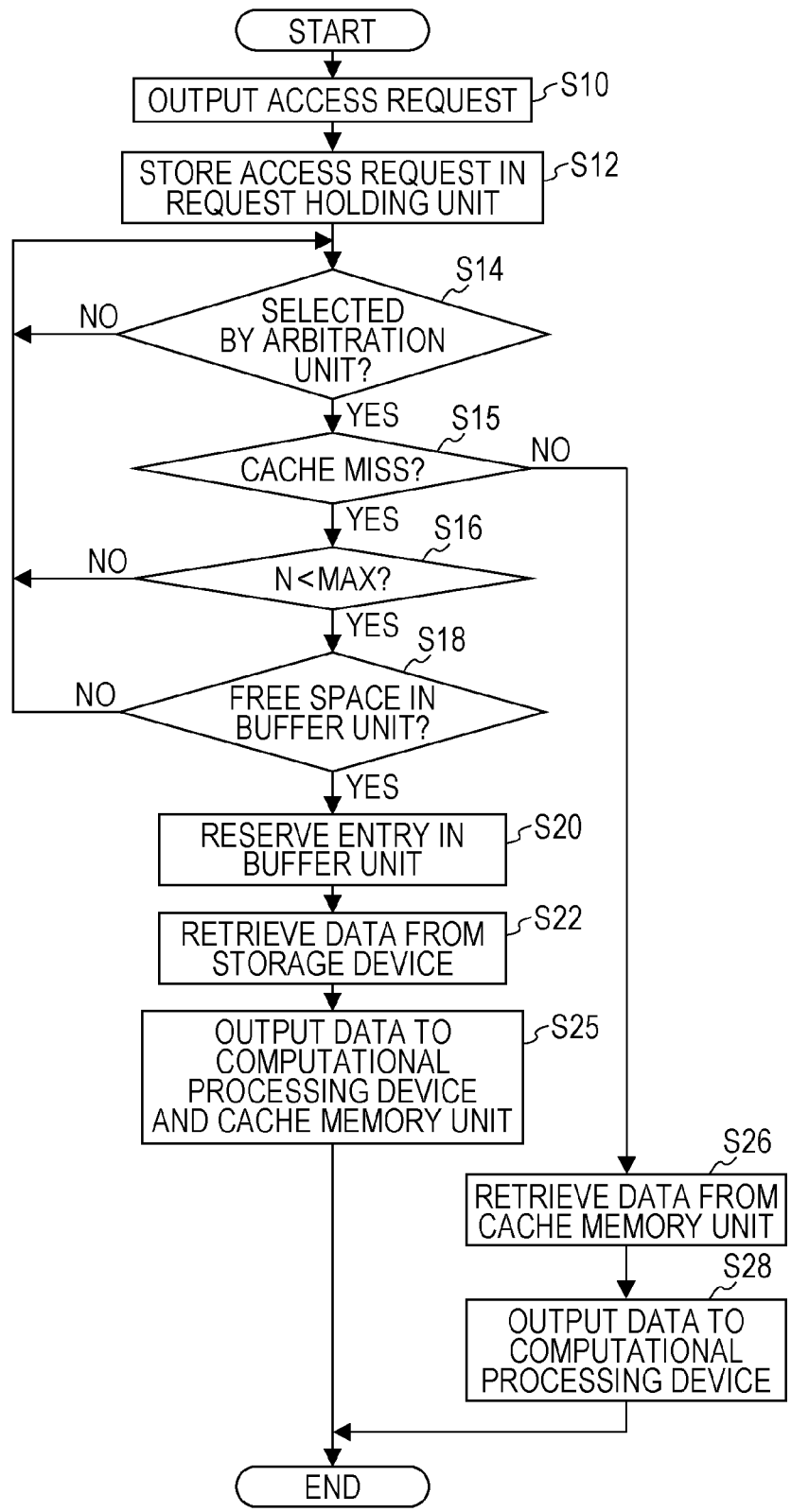
FIG. 4 illustrates exemplary operation of the information processing device and computational processing device illustrated in FIG. 3.

FIG. 4 illustrates exemplary operation of the information processing device 100A and computational processing device 200A illustrated in FIG. 3. That is, FIG. 4 illustrates an exemplary method of controlling the information processing device 100A and computational processing device 200A. Operations that are similar or identical to FIG. 2 are denoted with like signs, and detailed description of such operations will be reduced or omitted. The flow illustrated in FIG. 4 is realized in hardware, for example. Note that FIG. 4 illustrates the operation for an individual access request REQ and the operation of an individual request holding unit 220.

In this embodiment, a step S25 is executed instead of step S24 illustrated in FIG. 2. Also, steps S15, S26, and S28 are added in addition to the operational flow in FIG. 2. Step S15 is positioned between steps S14 and S16. The operations in steps S10, S12, S14, S16, S18, S20, S22, and S24 are similar to FIG. 2.

In step S15, the cache memory controller 260A determines a cache miss or cache hit. Step S16 is executed in the case of a cache miss, while step S26 is executed in the case of a cache hit.

In step S26, the cache memory controller 260A retrieves data from the cache memory unit 270A on the basis of an access request REQ from the arbitration unit 230. Next, in step S28, the cache memory controller 260A outputs the data retrieved from the cache memory unit 270A to the computational processor 210. Note that the execution of steps S26 and S28 may also be masked in the case where the access request REQ is a prefetch command. In other words, with prefetch commands, it is also possible to not transmit data (or programs) from the cache memory unit 270A to the computational processor 210.

Meanwhile, in the case where a cache miss is determined and a new entry ENT is reserved via steps S16, S18, and S20, the data retrieved from the storage device 300 is stored in the newly reserved entry ENT in step S22. Then, in step S25, the data retrieved from the storage device 300 is output to the computational processing device 200A, while also being stored in the cache memory unit 270A. However, the output of data to the computational processor 210 may also be masked in the case where data (or programs) are retrieved from the storage device 300 on the basis of a prefetch command, similarly to step S28.

Thus, in the present embodiment, a computational processing device 200A including a cache memory controller 260A and an information processing device 100A are able to reserve at least one entry ENT for each of the request holding units 220*a* and 220*b*, similarly to the embodiment illustrated in FIGS. 1 and 2. As a result, it is possible to lower the likelihood of a specific access request REQ being continually aborted compared to the related art, and lower the likelihood of the computational processor 210 hanging up due to such aborts compared to the related art.

Figure 5:
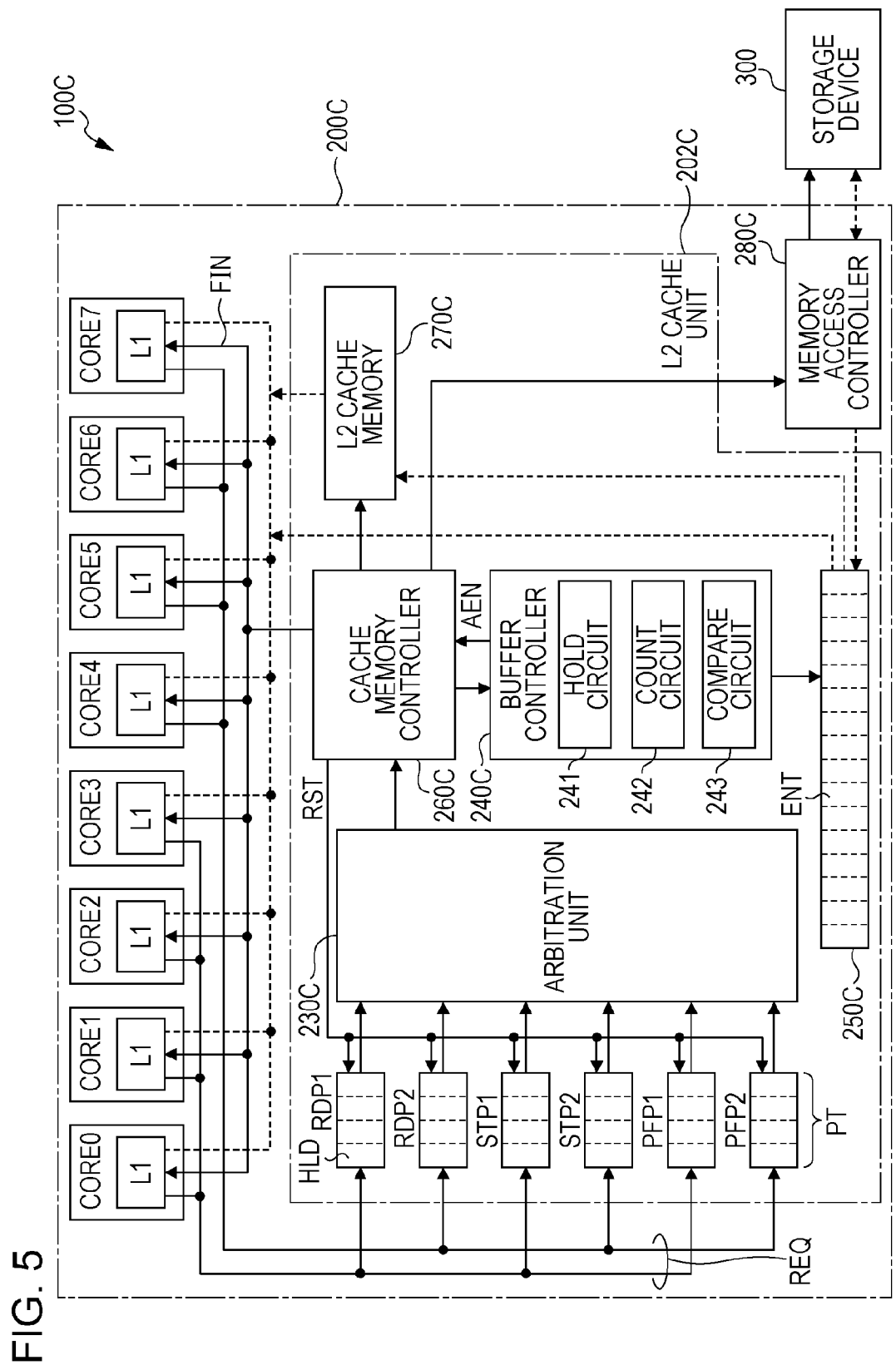
FIG. 5 illustrates an example of an information processing device and a computational processing device according to another embodiment.

FIG. 5 illustrates an example of an information processing device 100C and a computational processing device 200C according to another embodiment. Elements that are similar or identical to FIGS. 1 and 3 are denoted with like signs, and detailed description of such elements will be reduced or omitted.

The information processing device 100C includes a computational processing device 200C and a storage device 300. For example, the information processing device 100C is a computing device such as a server or personal computer, while the computational processing device 200C is a processor such as a CPU.

The computational processing device 200C includes eight core units CORE (CORE0 to CORE7), ports PT (RDP1, RDP2, STP1, STP2, PFP1, and PFP2), an arbitration unit 230C, a cache memory controller 260C, a buffer controller 240C, a buffer unit 250C, L2 cache memory 270C, and a memory access controller 280C. In FIG. 5, the area enclosed by a chain line represents an L2 cache unit 202C. In other words, the L2 cache unit 202C includes the ports PT, the arbitration unit 230C, the cache memory controller 260C, the buffer controller 240C, the buffer unit 250C, and the L2 cache memory 270C.

Each core unit CORE is, for example, a CPU core including a L1 cache unit indicated by the sign L1, and outputs access requests REQ to the storage device 300. The access requests REQ potentially include input/output requests for data handled by each core unit CORE, such as load commands or store commands, and prefetch commands for programs executed by each core unit CORE, for example. Each core unit CORE is an example of a computational processor. Note that the number of core units CORE is not limited to eight, and that it is sufficient for the computational processing device 200 to include at least one core unit CORE.

A load command is a command that stores data retrieved from L1 cache memory inside an L1 cache unit, from the L2 cache memory 270C, or from the storage device 300 in a register of a core unit CORE. In the case where the data corresponding to the load command is not in the L1 cache memory (a cache miss), the L1 cache unit outputs a load command to the L2 cache unit 202C. The store command is a command that stores data processed by a core unit CORE in the L1 cache memory. In the case where a cache line including the area for the data corresponding to the store command is not reserved in the L1 cache memory (a cache miss), the L1 cache unit outputs a store command to the L2 cache unit 202C. The L2 cache unit 202C, upon receiving a store command from the L1 cache unit, retrieves the data corresponding to the store command (the cache line) from the L2 cache memory 270C or the storage device 300, and outputs the retrieved data to the L1 cache unit. In this way, load commands and store commands received by the L2 cache unit 202C are commands that retrieve data from the L2 cache memory 270C or the storage device 300. The L1 cache memory includes a data cache that stores data corresponding to load commands and store commands, and a command cache that stores programs corresponding to prefetch commands, for example.

The ports RDP1, STP1, and PFP1 hold access requests REQ output from the core unit CORE0, CORE1, CORE2, and CORE3, for example. The ports RDP2, STP2, and PFP2 hold access requests REQ output from the core unit CORE4, CORE5, CORE6, and CORE7. The ports RDP1, RDP2, STP1, STP2, PFP1, and PFP2 are examples of request holding units.

The ports RDP (RDP1 and RDP2) hold load commands, while the ports STP (STP1 and STP2) hold store commands. The ports PFP (PFP1 and PFP2) hold prefetch commands. In other words, each core unit CORE outputs an access request REQ to one of the ports RDP, STP, and PFP according to the access type. Load commands, store commands, and prefetch commands are examples of access types, which are types of access requests REQ.

A load command is a type of command that stores programs and data in the L1 cache memory. A store command is a type of command that stores programs and data in the L1 cache memory. Although load commands and store commands are processed similarly by the L2 cache unit 202C, store commands are for the purpose of write-back after storage in the L1 cache memory, and the processing thereof looks different from the perspective of the core units CORE. A prefetch command is a type of command that stores programs and data with expected future use in the L2 cache memory 270C.

Figure 6:
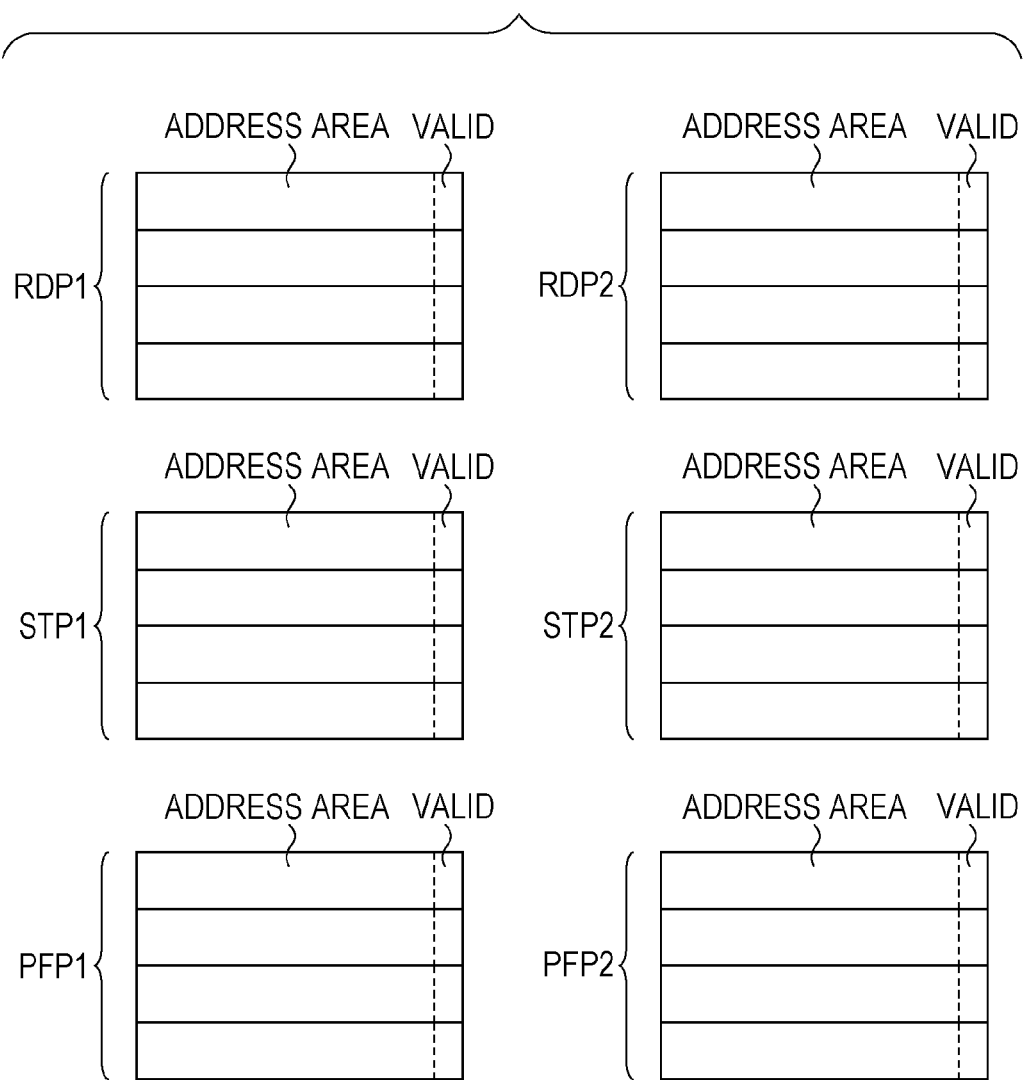
FIG. 6 illustrates an example of the ports illustrated in FIG. 5.

In this embodiment, each port PT includes four holding areas that hold access requests REQ, but the number of holding areas HLD is not limited to four. Each port PT outputs held access requests REQ to the arbitration unit 230C. FIG. 6 illustrates an example of the ports RDP1, RDP2, STP1, STP2, PFP1, and PFP2.

The arbitration unit 230C arbitrates access requests REQ respectively held in the ports PT, and outputs an access request REQ selected by arbitration to the cache memory controller 260C, similarly to the arbitration unit 230 illustrated in FIG. 1. For example, the arbitration unit 230C uses a technique such as round-robin to successively select access requests REQ held in the ports RDP1, RDP2, STP1, STP2, PFP1, and PFP2.

Figure 7:
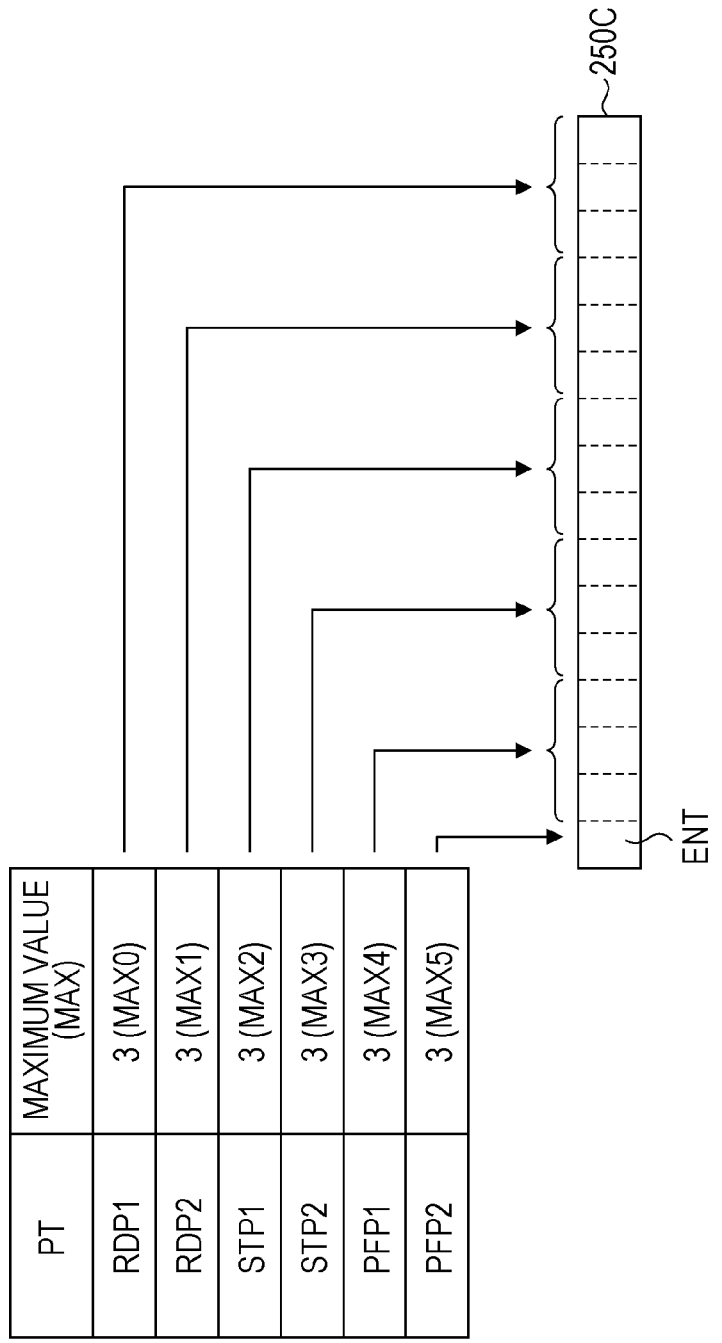
FIG. 7 illustrates an example of entry allocation in the buffer unit illustrated in FIG. 5.

The buffer unit 250C includes 16 entries ENT that hold data retrieved from the storage device 300. Note that the number of entries ENT is not limited to 16, as it is sufficient for there to be multiple entries ENT. FIG. 7 illustrates an example of maximum values MAX for the numbers of entries ENT allocable to each of the ports RDP1, RDP2, STP1, STP2, PFP1, and PFP2.

The buffer controller 240C includes a hold circuit 241, a count circuit 242, and a compare circuit 243. The hold circuit 241 stores maximum values MAX for the number of entries ENT respectively allocable to each of the ports RDP1, RDP2, STP1, STP2, PFP1, and PFP2. In other words, the hold circuit 241 holds a maximum value MAX for each access type.

Figure 8:
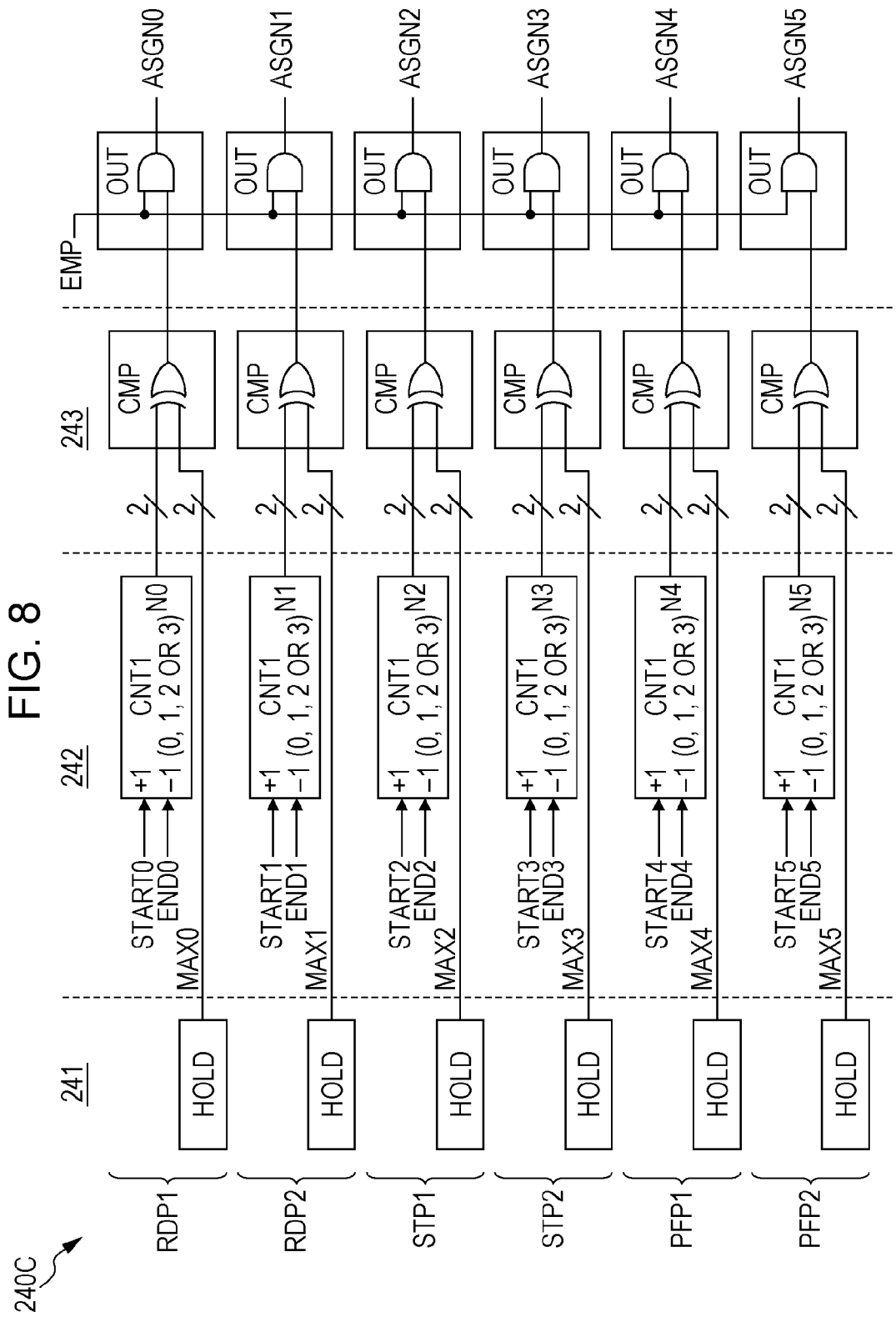
FIG. 8 illustrates an example of the buffer controller illustrated in FIG. 5.

The count circuit 242 counts the number of entries ENT reserved for each of the ports RDP1, RDP2, STP1, STP2, PFP1, and PFP2, and holds the results as count values N (N0 to N5 in FIG. 8). In other words, the count circuit 242 computes and holds a count value N for each access type.

The compare circuit 243 compares the count value N to the maximum value MAX for each of the ports RDP1, RDP2, STP1, STP2, PFP1, and PFP2. In other words, the compare circuit 243 compares the count value N to the maximum value MAX for each access type. Then, in the case where the cache memory controller 260C has determined a cache miss in the L2 cache memory 270C, the buffer controller 240C determines whether or not to reserve an entry ENT on the basis of the comparison results in the compare circuit 243.

For example, in the case where a count value N is less than a maximum value MAX and there is free space for an entry ENT in the buffer unit 250C, the buffer controller 240C reserves a new entry ENT on the basis of instructions from the cache memory controller 260C. The buffer controller 240C outputs an access enable signal AEN to the cache memory controller 260C on the basis of the entry ENT reservation. When a count value N is equal to the maximum value MAX, the buffer controller 240C does not output an access enable signal AEN, without reserving a new entry ENT.

Also, in the case where data retrieved from the storage device 300 via the memory access controller 280C is being stored in an entry ENT, the buffer controller 240C transmits the stored data to the core unit CORE that issued the access request REQ, and to the L2 cache memory 270C. FIG. 8 illustrates an example of the buffer controller 240C.

In the case of determining a cache hit in the L2 cache memory 270C, the cache memory controller 260C retrieves the data corresponding to the access request REQ from the L2 cache memory 270C. The data retrieved from the L2 cache memory 270C is output to the core unit CORE that issued the access request REQ.

In the case of determining a cache miss in the L2 cache memory 270C, the cache memory controller 260C requests the buffer controller 240C to reserve an entry ENT. The cache memory controller 260C then outputs an access request REQ received from the arbitration unit 230C to the memory access controller 280C in response to an access enable signal AEN from the buffer controller 240C. The cache memory controller 260C does not output an access request REQ to the memory access controller 280C in the case where a cache miss in the L2 cache memory 270C is determined and an access enable signal AEN is not received, or in other words, in the case where an entry ENT is not reserved. Thus, the access request REQ is aborted.

Also, in the case where data is transmitted to a core unit CORE from the buffer unit 250C or the L2 cache memory 270C, the cache memory controller 260C outputs an access request REQ finish response FIN to the core unit CORE that issued the access request REQ. In addition, in the case where data is transmitted to a core unit CORE from the buffer unit 250C or the L2 cache memory 270C, the cache memory controller 260C outputs a reset signal RST to the port PT that output the access request REQ. The port PT, upon receiving the reset signal RST, invalidates the corresponding access request REQ.

The memory access controller 280C, on the basis of an access request REQ from the cache memory controller 260C, outputs to the storage device 300 an access signal causing the storage device 300 to execute retrieval operations (retrieval request). The memory access controller 280C outputs the data retrieved from the storage device 300 to the buffer unit 250C.

The memory access controller 280C includes functionality to output an access signal causing the storage device 300 to execute writing operations (write request), together with write data, to the storage device 300. A write request is generated in the case of writing back data stored in the L2 cache memory 270C to the storage device 300. Note that a write request is selected by the arbitration unit 230C via another port not illustrated in FIG. 5. Data to be written to the storage device 300 in correspondence with a write request is output to the memory access controller 280C via another buffer unit not illustrated in FIG. 5.

Note that the memory access controller 280C may also be disposed externally to the computational processing device 200C. Also, in the case where the cache memory controller 260C includes functionality for controlling access to the storage device 300, the storage device 300 is connected to the cache memory controller 260C without going through the memory access controller 280C. In other words, in this case, the computational processing device 200C does not have the memory access controller 280C. This applies similarly to the embodiments hereinafter, and the computational processing devices 200D, 200E, 200F, 200G, and 200H may likewise not include the memory access controller 280C in some cases.

FIG. 6 illustrates an example of the ports RDP1, RDP2, STP1, STP2, PFP1, and PFP2 illustrated in FIG. 5. Each of the ports RDP1, RDP2, STP1, STP2, PFP1, and PFP2 includes, for every access request REQ, an address area storing an address indicating a storage area in the storage device 300 where data is stored, and an area that holds a Valid flag. The Valid flag indicates whether the address stored in the address area is valid or invalid. Each address area is 32 bits, and each Valid flag is 1 bit, for example.

In the case of outputting an access request REQ to a respective port, a core unit CORE illustrated in FIG. 5 stores the address included in the access request REQ in an address area corresponding to a Valid flag in the reset state, and puts the corresponding Valid flag in a set state. Also, the Valid flag in the set state is reset when a corresponding reset signal RST is received from the L2 cache memory 270C.

FIG. 7 illustrates an example of entry ENT allocation in the buffer unit 250C illustrated in FIG. 5. In this embodiment, the buffer unit 250C includes 16 entries ENT. In addition, the maximum values MAX (MAX0, MAX1, MAX2, MAX3, MAX4, and MAX5) for the number of entries ENT able to be reserved by the ports RDP1, RDP2, STP1, STP2, PFP1, and PFP2 are each set to 3.

The maximum value MAX for the number of allocable entries ENT is set such that the sum of the maximum values for the number of allocable entries ENT corresponding to the other ports PT excepting one port PT (in this example, 15) is less than the total number of entries ENT (in this example, 16). In other words, the sum of the maximum values MAX respectively corresponding to access types, excepting one of the multiple access types, is set to be less than the total number of entries ENT. For this reason, the maximum values MAX for the number of entries ENT able to be reserved by the ports RDP1, RDP2, STP1, STP2, PFP1, and PFP2 may also be set to 3, 3, 2, 2, 4, and 3, for example.

In this embodiment, one entry ENT for the port PFP2 may be reserved according to arbitration by the arbitration unit 230C, even in the case where the maximum value of 3 entries ENT each is reserved for the ports RDP1, RDP2, STP1, STP2, and PFP1, for example. Thus, it is possible to ensure that at least one entry ENT is reserved for all ports RDP1, RDP2, STP1, STP2, PFP1, and PFP2.

Note that in FIG. 7, each port PT and the reservable entries ENT are associated with arrows for the sake of clarity. However, the values held in the hold circuit 241 illustrated in FIG. 5 indicate the maximum values MAX for the number of reservable entries ENT, and do not indicate physical positions of reservable entries ENT. Similarly to FIG. 7, the arrows indicated in FIGS. 11, 14, and 17 likewise do not indicate physical positions of reservable entries ENT.

FIG. 8 illustrates an example of the buffer controller 240C illustrated in FIG. 5. The hold circuit 241 includes holding units HOLD that hold a maximum value MAX for each of the ports RDP1, RDP2, STP1, STP2, PFP1, and PFP2. The count circuit 242 includes a counter CNT1 for each of the ports RDP1, RDP2, STP1, STP2, PFP1, and PFP2. The compare circuit 243 includes a comparer CMP for each of the ports RDP1, RDP2, STP1, STP2, PFP1, and PFP2. In addition, the buffer controller 240C includes output circuits OUT that output assign signals ASGN (ASGN0, ASGN1, ASGN2, ASGN3, ASGN4, and ASGN5) for every port RDP1, RDP2, STP1, STP2, PFP1, and PFP2 on the basis of the determination result from each comparer CMP.

Each holding unit HOLD includes read-only memory (ROM) that stores a value from 1, 2, and 3, for example, and outputs the stored value as a maximum value MAX (MAX0, MAX1, MAX2, MAX3, MAX4, and MAX5). The maximum values MAX0 to MAX5 are output as 2-bit signals. The ROM may also be non-volatile memory or a fuse circuit. Note that each holding unit HOLD may also include a register that rewritably holds a maximum value MAX. In this case, the values of the signals MAX0 to MAX5 are modifiable according to the specifications of the information processing device 100C.

Since the counters CNT1 are circuits similar or identical to each other, herein the counter CNT1 corresponding to the port RDP1 will be described. The counter CNT1 counts up +1 in response to receiving a start signal START0, counts down −1 in response to receiving an end signal END0, and outputs the counter value as a count value N0. The count value N0 indicates the number of entries ENT reserved for the port RDP1. The count value N0 is a value from among "0", "1", "2", and "3" in correspondence with the maximum value MAX (3), and is expressed with 2 bits. The count values N1 to N5 of the other counters CNT1 indicate the numbers of entries ENT reserved for the corresponding ports PT.

The start signal START0 is generated in the case where an entry ENT is reserved in correspondence with an access request REQ held in the port RDP1 on the basis of the assign signal ASGN0, for example. Similarly to the start signal START0, the start signals START1 to START5 are likewise generated in the case where an entry ENT is reserved in correspondence with an access request REQ held in a corresponding port PT on the basis of the respective assign signals ASGN1 to ASGN5. The start signals START0 to START5 are pulse signals, for example.

The end signal END0 is generated in the case where data stored in an entry ENT is output to a core unit CORE and the L2 cache memory 270C in correspondence with an access request REQ held in the port RDP1, for example. Similarly to the end signal END0, the end signals END1 to END5 are likewise generated in the case where data stored in an entry ENT is output to a core unit CORE and the L2 cache memory 270C in correspondence with an access request REQ held in a corresponding port PT. The end signals END0 to END5 are pulse signals, for example.

The comparer CMP corresponding to the port RDP1 outputs a low level in the case where the count value N0 and the maximum value MAX0 match, and outputs a high level in the case where the count value N0 and the maximum value MAX0 do not match. In other words, the comparer CMP corresponding to the port RDP1 outputs a high level in the case where the count value N0 is "0", "1", or "2", and outputs a low level in the case where the count value N0 is "3".

The output circuits OUT output a high level assign signal ASGN (ASGN0 to ASGN5) in the case where an empty signal EMP and the output of a corresponding comparer CMP are both high level. In addition, the output circuits OUT output a low level assign signal ASGN in the case where either the empty signal EMP or the output of the corresponding comparer CMP is low level.

The buffer controller 240C sets the empty signal EMP to high level in the case where an empty entry ENT exists, and sets the empty signal EMP to low level in the case where an empty entry ENT does not exist. For this reason, an assign signal ASGN is output in the case where at least one entry ENT is empty, and the number of entries ENT reserved for the corresponding port PT is less than the maximum value MAX. The buffer controller 240C then newly reserves an entry ENT for a corresponding port PT on the basis of an assign signal ASGN (one of ASGN0 to ASGN5).

Figure 9:
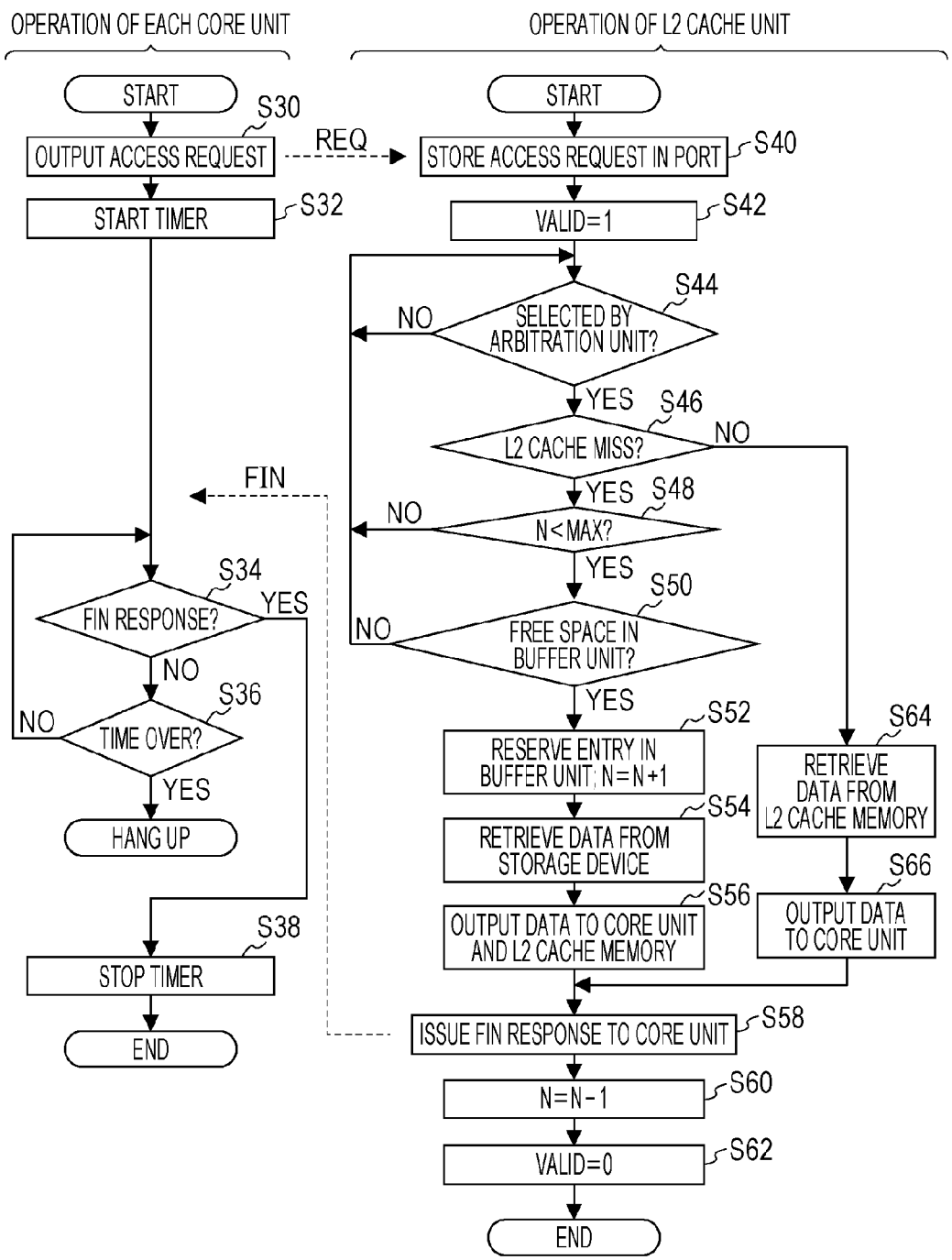
FIG. 9 illustrates exemplary operation of the computational processing device illustrated in FIG. 5.

FIG. 9 illustrates exemplary operation of the computational processing device 200C illustrated in FIG. 5. The flow illustrated in FIG. 9 is realized in hardware, for example. Detailed description will be reduced or omitted for operations that are similar or identical to operations in FIG. 2 and FIG. 4. Note that FIG. 9 illustrates the operation for an individual access request REQ, the operation of an individual core unit CORE, and the operation of an individual port PT.

The steps conducted by the L2 cache unit 202C illustrated in FIG. 9 are segmented in order to better demonstrate operation, but in actual practice, multiple steps may also be executed in parallel by the cooperative action of hardware in the L2 cache unit 202C. The operations in steps S44, S46, S48, S50, S52, S54, S56, S62, and S64 are similar to the operations in steps S14, S15, S16, S18, S20, S22, S25, S26, and S28 illustrated in FIG. 4.

In step S30, a core unit CORE outputs an access request REQ to a port PT that corresponds to the access type, and in step S32, starts the operation of a timer for detecting hang-up. The timer built into each core unit CORE may be hardware or software. Note that in the case where data corresponding to the access request REQ is not being stored in the L1 cache unit, a core unit CORE outputs an access request REQ to the L2 cache unit 202C.

In step S34, each core unit CORE checks whether or not a finish response FIN from the cache memory controller 260C exists. In the case of receiving a finish response FIN, each core unit CORE stops the timer in step S38, and finishes operations corresponding to the access request REQ. In the case of not receiving a finish response FIN, in step S36 each core unit CORE determines whether or not a given amount of time has elapsed on the basis of the count value of the timer.

In the case where the given amount of time has not elapsed, step S34 is executed again. In the case where the given amount of time has elapsed, each core unit CORE hangs up, having not received data with respect to the access request REQ issued in step S30 within the given amount of time. Note that in the present embodiment, the likelihood of a hang-up is low compared to the related art, since at least one entry ENT is reservable for all ports PT.

Meanwhile, the L2 cache unit 202C operates as follows. In steps S40 and S42, a port PT that has received an access request REQ stores the address included in the access request REQ in the address area illustrated in FIG. 6, and sets the Valid flag to "1", for example. Note that the storing of an address in the address area and the setting of the Valid flag may also be executed by the core unit CORE that outputs the access request REQ.

Next, in step S44, the arbitration unit 230C selects one access request REQ held in the port PT, and outputs that access request REQ to the cache memory controller 260C and the buffer controller 240C. In step S46, the cache memory controller 260C determines whether or not data corresponding to the address included in the access request REQ from the arbitration unit 230C is stored in the L2 cache memory 270C. In other words, it is determined whether there is a cache miss or a cache hit in the L2 cache memory 270C. Step S48 is executed in the case of a cache miss, while step S64 is executed in the case of a cache hit.

In step S64, the cache memory controller 260C retrieves data from the L2 cache memory 270C on the basis of an access request REQ from the arbitration unit 230C. Next, in step S66, the cache memory controller 260C outputs the data retrieved from the L2 cache memory 270C to the core unit CORE that issued the access request REQ. After executing step S66, step S58 is executed.

Note that the execution of steps S64 and S66 may also be masked for operations based on access requests REQ stored in the ports PFP1 and PFP2 (that is, prefetch commands). In this case, data such as commands (programs) held in the L2 cache memory 270C are not transferred to the L1 cache memory, but stored in the L1 cache memory of the core units CORE on the basis of new access requests REQ stored in the ports RDP1 and RDP2.

Meanwhile, in the case where a cache miss is determined, in step S48 the compare circuit 243 of the buffer controller 240C compares the number N of reserved entries ENT to the maximum value MAX. In the case where the reserved number N is the maximum value MAX, reservation of an entry ENT is not allowed, and thus the access request REQ is aborted, and the arbitration unit 230C selects another access request REQ. When an access request REQ is aborted, the corresponding port PT continues to hold the access request REQ, and the cache memory controller 260C does not output the access request REQ to the storage device 300.

In the case where the reserved number N is less than the maximum value MAX, in step S50 the buffer controller 240C checks whether or not a free entry ENT exists in the buffer unit 250C. In the case where a free entry ENT does not exist, the access request REQ is aborted, and the arbitration unit 230C selects another access request REQ.

In the case where a free entry ENT does exist, in step S52 the buffer controller 240C reserves the entry ENT in which to store data retrieved from the storage device 300 in correspondence with the access request REQ selected by the arbitration unit 230C. In addition, the count circuit 242 of the buffer controller 240C increases by "1" the number N of entries ENT reserved for the port PT holding the access request REQ.

In step S54, the cache memory controller 260C outputs the access request REQ to the storage device 300 via the memory access controller 280C, on the basis of a notification of an entry ENT reservation from the buffer controller 240C, or access enable signal AEN. The storage device 300 executes a retrieval operation on the basis of the access request REQ, and outputs data retrieved from a memory cell to the buffer unit 250C via the memory access controller 280C. The buffer unit 250C stores the data output from the storage device 300 in the entry ENT reserved in step S52.

In step S56, the buffer unit 250C outputs the data stored in the entry ENT to the core unit CORE that issued the access request REQ, and also stores the data in the L2 cache memory 270C. However, outputting to the core units CORE (storage in the L1 cache memory) may also be masked in the case of data retrieved from the storage device 300 on the basis of access requests REQ stored in the ports PFP1 and PFP2 (that is, prefetch commands), similarly to step S66.

Next, in step S58, the cache memory controller 260C outputs a finish response FIN to the core unit CORE that issued the access request REQ. In step S60, the count circuit 242 of the buffer controller 240C decreases by "1" the number N of entries ENT reserved for the port PT holding the access request REQ used to retrieve the data that was output to a core unit CORE.

Next, in step S62, the cache memory controller 260C outputs a reset signal RST to the port PT that output the access request REQ. Upon receiving the reset signal RST, the port PT resets the Valid flag holding the corresponding access request REQ to "0", for example, invalidating the access request REQ.

Thus, in the foregoing embodiment, it is likewise possible to reserve at least one entry ENT for each port PT, similarly to the embodiments illustrated in FIGS. 1 to 4. As a result, it is possible to lower the likelihood of a specific access request REQ being continually aborted compared to the related art, and lower the likelihood of the core units CORE hanging up due to such aborts compared to the related art.

Figure 10:
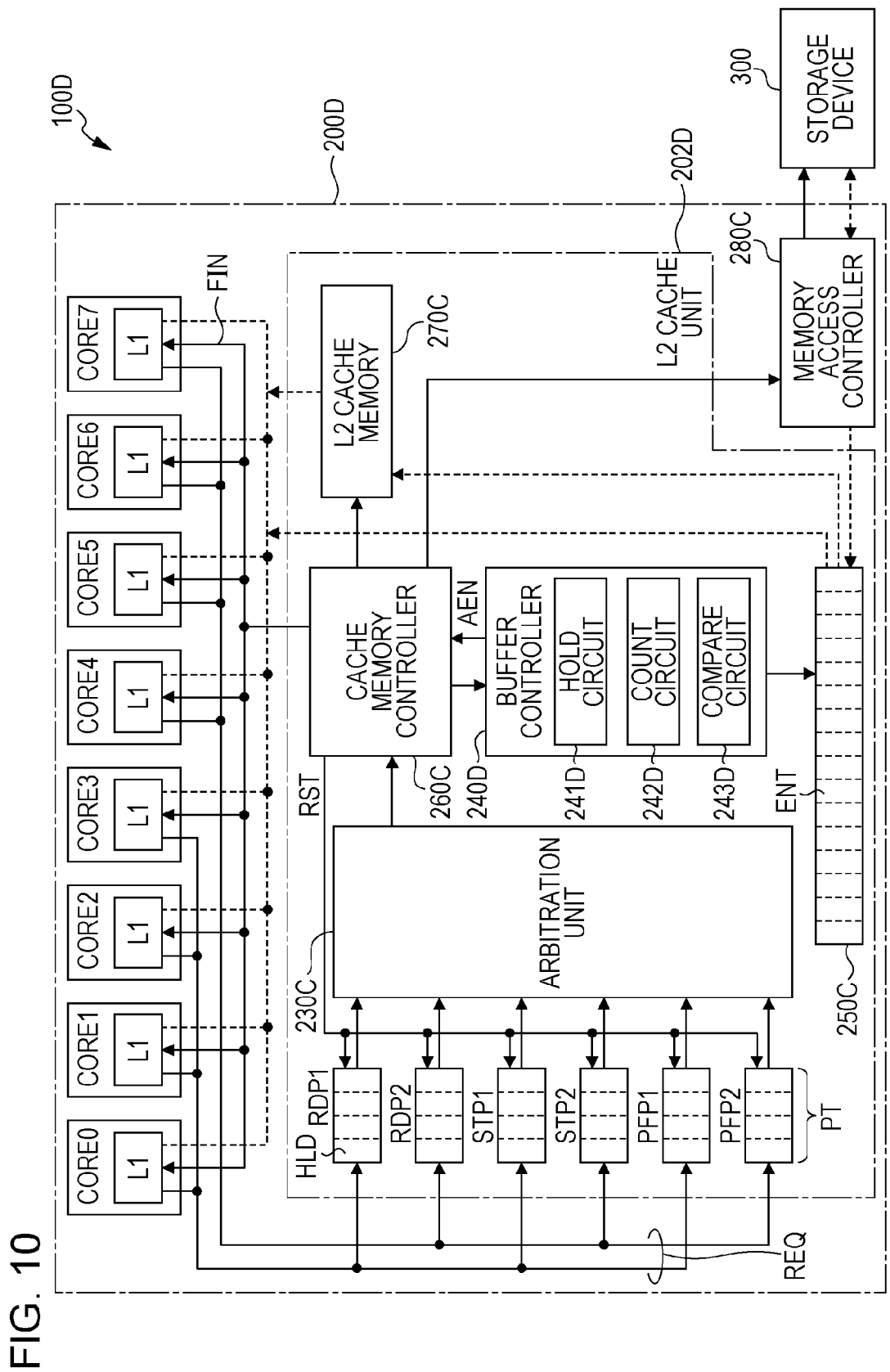
FIG. 10 illustrates an example of an information processing device and a computational processing device according to another embodiment.

FIG. 10 illustrates an example of an information processing device 100D and a computational processing device 200D according to another embodiment. Elements that are similar or identical to FIGS. 1, 2 and 5 are denoted with like signs, and detailed description of such elements will be reduced or omitted.

The information processing device 100D, the computational processing device 200D, and the L2 cache unit 202D include a buffer controller 240D instead of the buffer controller 240C illustrated in FIG. 5. The rest of the configuration of the information processing device 100D, the computational processing device 200D, and the L2 cache unit 202D is similar to the information processing device 100C, the computational processing device 200C, and the L2 cache unit 202C illustrated in FIG. 5.

Figure 12:
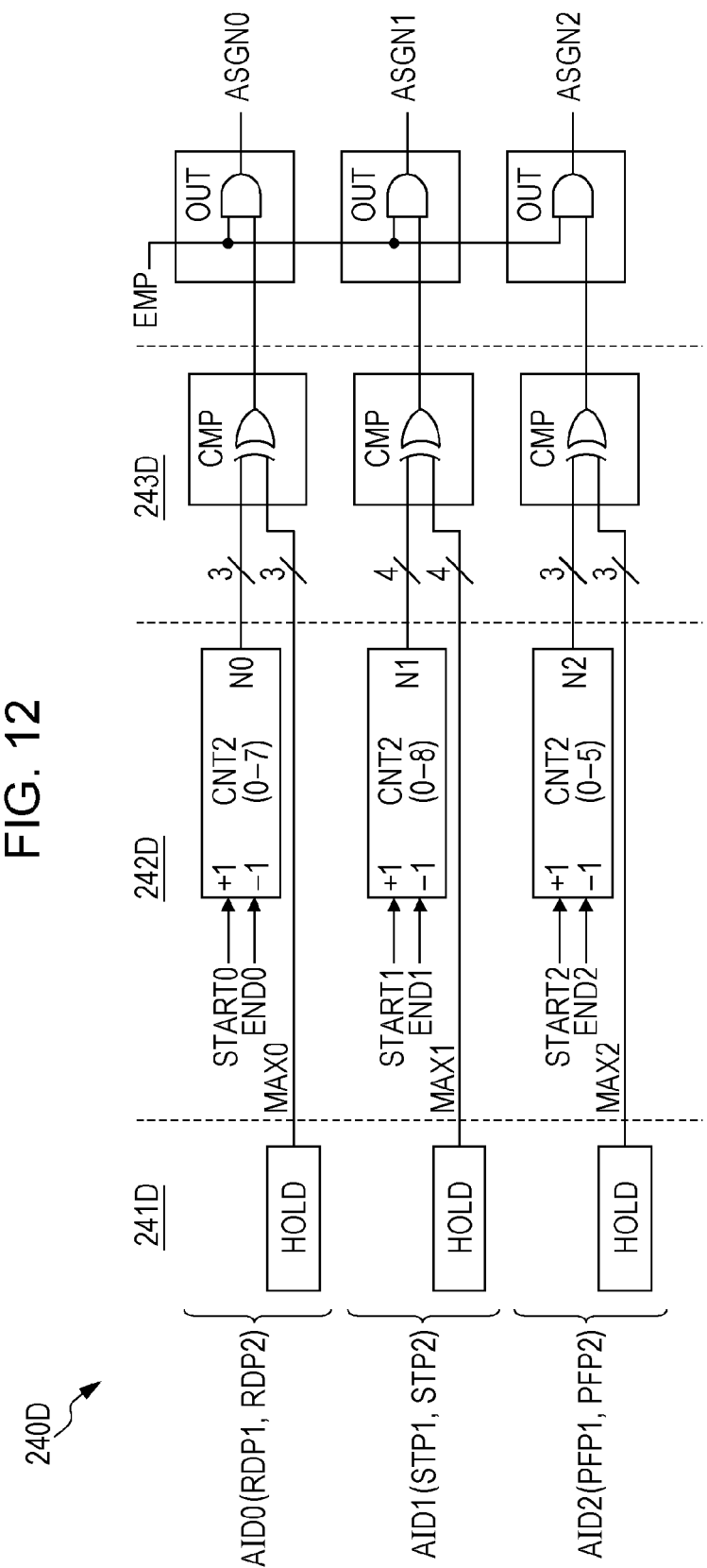
FIG. 12 illustrates an example of the buffer controller illustrated in FIG. 10.

For example, the information processing device 100D is a computing device such as a server or personal computer, while the computational processing device 200D is a processor such as a CPU. The buffer controller 240D includes a hold circuit 241D, a count circuit 242D, and a compare circuit 243D. FIG. 12 illustrates an example of the buffer controller 240D.

Figure 11:
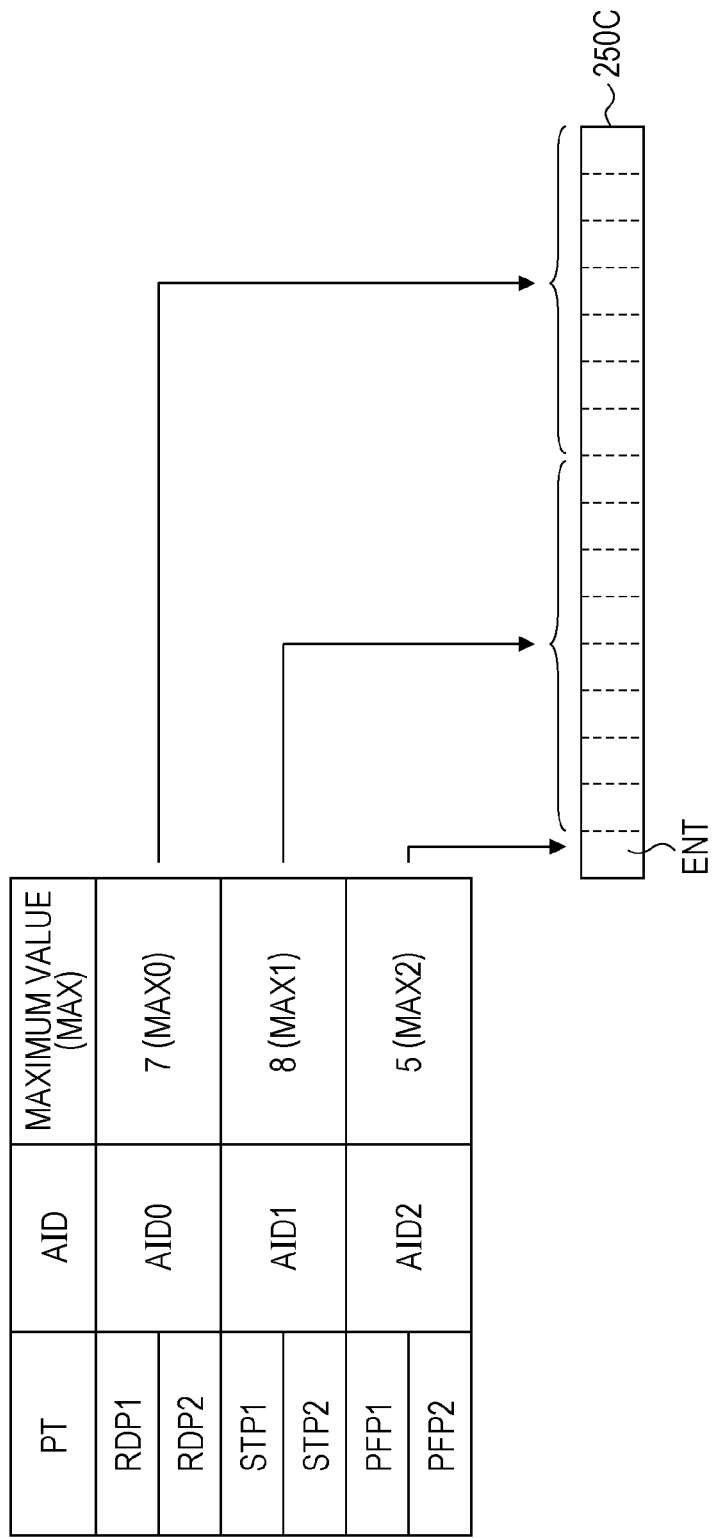
FIG. 11 illustrates an example of entry allocation in the buffer unit illustrated in FIG. 10.

FIG. 11 illustrates an example of entry ENT allocation in the buffer unit 250D illustrated in FIG. 10. In this embodiment, access identifiers AID (AID0, AID1, and AID2) are each allocated to multiple ports PT, and maximum values MAX (MAX0, MAX1, and MAX2) for the number of reservable entries ENT are determined.

For example, the access identifier AID0 is allocated to the ports RDP1 and RDP2 in which are stored load commands (one access type). The access identifier AID1 is allocated to the ports STP1 and STP2 in which are stored store commands (another access type). The access identifier AID2 is allocated to the ports PFP1 and PFP2 in which are stored prefetch commands (another access type).

The maximum value MAX0 for the number of reservable entries ENT shared by the ports RDP1 and RDP2 identified by the access identifier AID0 is set to 7, for example. The maximum value MAX1 for the number of reservable entries ENT shared by the ports STP1 and STP2 identified by the access identifier AID1 is set to 8, for example. The maximum value MAX2 for the number of reservable entries ENT shared by the ports PFP1 and PFP2 identified by the access identifier AID2 is set to 5, for example.

The maximum values MAX for the number of allocable entries ENT are set such that the sum of the maximum values for the number of allocable entries ENT corresponding to the other access identifiers AID excepting one access identifier AID is less than the total number of entries ENT (in this example, 16). In this example, the maximum values MAX for the number of allocable entries ENT are set such that the sum of the maximum values for the number of allocable entries ENT corresponding to the access identifiers AID0 and AID1 (15) is less than the total number of entries ENT (16). For this reason, the maximum values MAX for the number of entries ENT able to be reserved by the access identifiers AID0, AID1, and AID2 may also be set to 7, 8, and 7, for example.

In this embodiment, one entry ENT for the access identifier AID2 may be reserved according to arbitration by the arbitration unit 230C, even in the case where the maximum value of 15 entries ENT is reserved for the access identifiers AID0 and AID1. In addition, in the case where the input frequency of access requests REQ into the port RDP1 is low, for example, it is possible to increase the number of allocable entries ENT corresponding to access requests REQ held in the port RDP2 compared to FIG. 7. In other words, by setting a maximum value MAX for the number of allocable entries ENT for each group of ports PT that receive the same type of access requests REQ, it is possible to increase the number of reservable entries ENT for each port PT compared to FIG. 7.

FIG. 12 illustrates an example of the buffer controller 240D illustrated in FIG. 10. Detailed description will be reduced or omitted for elements that are similar or identical to FIG. 8.

The hold circuit 241D includes holding units HOLD that respectively hold maximum values MAX0, MAX1, and MAX2 for the access identifiers AID0, AID1, and AID2. The count circuit 242D includes counters CNT2 respectively corresponding to the access identifiers AID0, AID1, and AID2. The compare circuit 243D includes comparers CMP respectively corresponding to the access identifiers AID0, AID1, and AID2. In addition, the buffer controller 240D includes output circuits OUT that output an assign signal ASGN (ASGN0, ASGN1, and ASGN2) for each of the access identifiers AID0, AID1, and AID2 on the basis of the determination result from each comparer CMP.

Similarly to FIG. 8, each holding unit HOLD includes ROM that stores a maximum value MAX, and outputs the stored value as a maximum value MAX (one of MAX0 to MAX2). The maximum values MAX0 to MAX2 are output as 3-bit or 4-bit signals. Note that each holding unit HOLD may also include a register that rewritably holds a maximum value MAX.

The counters CNT2 are similar or identical circuits to the counters CNT1 illustrated in FIG. 8, except that the upper boundary on the counter value is the maximum value MAX held in the corresponding holding unit HOLD. For example, the counter CNT2 corresponding to the access identifier AID0 counts up "+1" in response to receiving a start signal START0, counts down "−1" in response to receiving an end signal END0, and outputs the counter value CO as a count value N0. The count value N0 is a value from "0" to "7" in correspondence with the maximum value of the signal MAX0 (7), and is expressed with 3 bits. The count values N1 and N2 of the other counters CNT2 indicate the numbers of entries ENT reserved for the corresponding ports PT.

The start signal START0 is generated in the case where an entry ENT is reserved in correspondence with an access request REQ held in the port RDP1 or RDP2 identified by the access identifier AID0, on the basis of the assign signal ASGN0. The start signal START1 is generated in the case where an entry ENT is reserved in correspondence with an access request REQ held in the port STP1 or STP2 identified by the access identifier AID1, on the basis of the assign signal ASGN1. The start signal START2 is generated in the case where an entry ENT is reserved in correspondence with an access request REQ held in the port PFP1 or PFP2 identified by the access identifier AID2, on the basis of the assign signal ASGN2.

The end signal END0 is generated in the case where data stored in an entry ENT is output to a core unit CORE and the L2 cache memory 270C in correspondence with an access request REQ held in the port RDP1 or RDP2 identified by the access identifier AID0. The end signal END1 is generated in the case where data stored in an entry ENT is output to a core unit CORE and the L2 cache memory 270C in correspondence with an access request REQ held in the port STP1 or STP2 identified by the access identifier AID1. The end signal END2 is generated in the case where data stored in an entry ENT is output to a core unit CORE and the L2 cache memory 270C in correspondence with an access request REQ held in the port PFP1 or PFP2 identified by the access identifier AID2.

Operation of the comparers CMP is similar to the operation of the comparers CMP illustrated in FIG. 8. In other words, each comparer CMP outputs a low level in the case where the count value N output from a counter CNT2 matches the maximum value MAX from a holding unit HOLD, and outputs a high level in the case where the count value N output from a counter CNT2 is less than the maximum value MAX.

Operation of the output circuit OUT is similar to the operation of the output circuits OUT illustrated in FIG. 8. In other words, the output circuits OUT output a high level assign signal ASGN (ASGN0, ASGN1, and ASGN2) when there is a free entry ENT corresponding to an access identifier AID (EMP=H), and the number of reserved entries ENT is less than the maximum value MAX.

Thus, in this embodiment, a maximum value MAX is set for the number of allocable entries ENT, for each of multiple groups of ports PT that receive the same type of access request REQ (RDP1 and RDP2, STP1 and STP2, or PFP1 and PFP2). Thus, it is possible to increase the maximum value MAX for the number of allocable entries ENT corresponding to the same type of access request REQ compared to FIG. 7, and it becomes possible to efficiently distribute entries ENT to the ports PT. As a result, it is possible to inhibit the occurrence of aborted access requests REQ, and lower the likelihood of the core units CORE hanging up due to such aborts compared to the related art.

Figure 13:
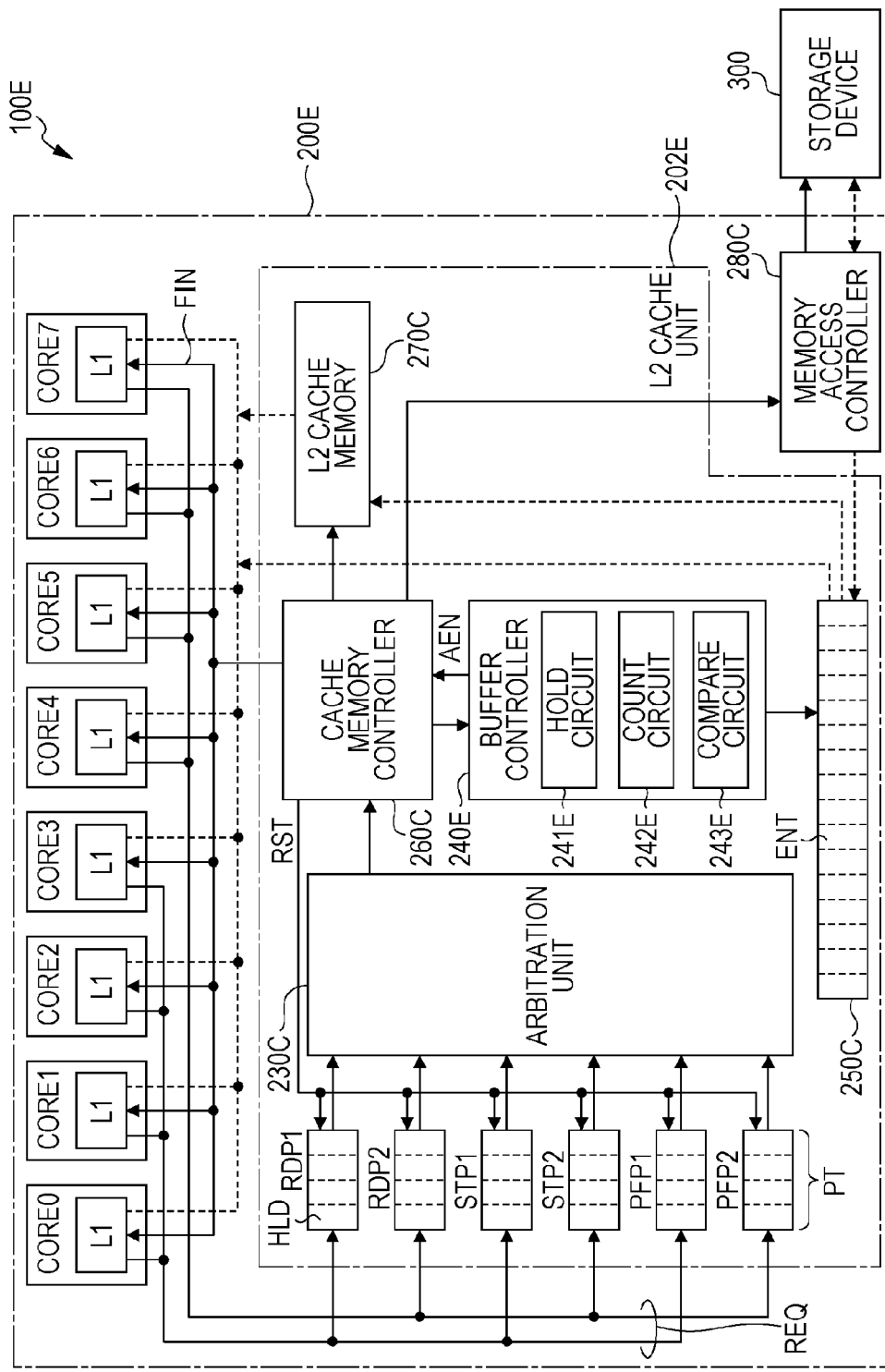
FIG. 13 illustrates an example of an information processing device and a computational processing device according to another embodiment.

FIG. 13 illustrates an example of an information processing device 100E and a computational processing device 200E according to another embodiment. Elements that are similar or identical to FIGS. 1, 2 and 5 are denoted with like signs, and detailed description of such elements will be reduced or omitted.

The information processing device 100E, the computational processing device 200E, and the L2 cache unit 202E include a buffer controller 240E instead of the buffer controller 240C illustrated in FIG. 5. The rest of the configuration of the information processing device 100E, the computational processing device 200E, and the L2 cache unit 202E is similar to the information processing device 100C, the computational processing device 200C, and the L2 cache unit 202C illustrated in FIG. 5.

Figure 15:
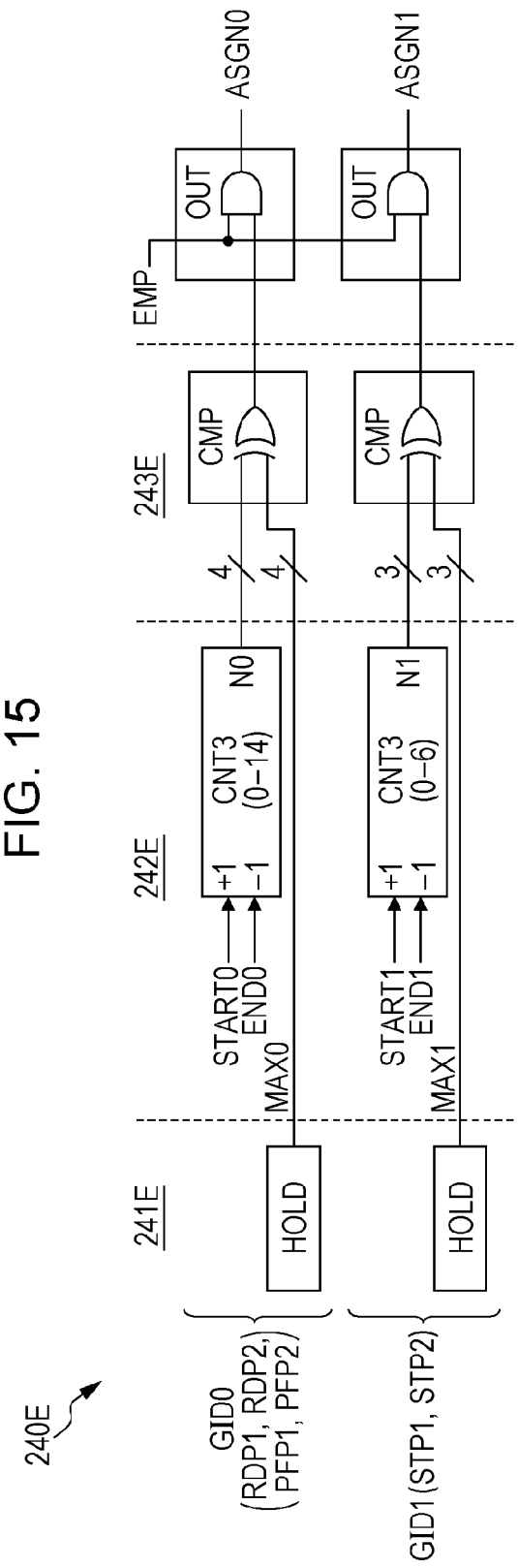
FIG. 15 illustrates an example of the buffer controller illustrated in FIG. 13.

For example, the information processing device 100E is a computing device such as a server or personal computer, while the computational processing device 200E is a processor such as a CPU. The buffer controller 240E includes a hold circuit 241E, a count circuit 242E, and a compare circuit 243E. FIG. 15 illustrates an example of the buffer controller 240E.

Figure 14:
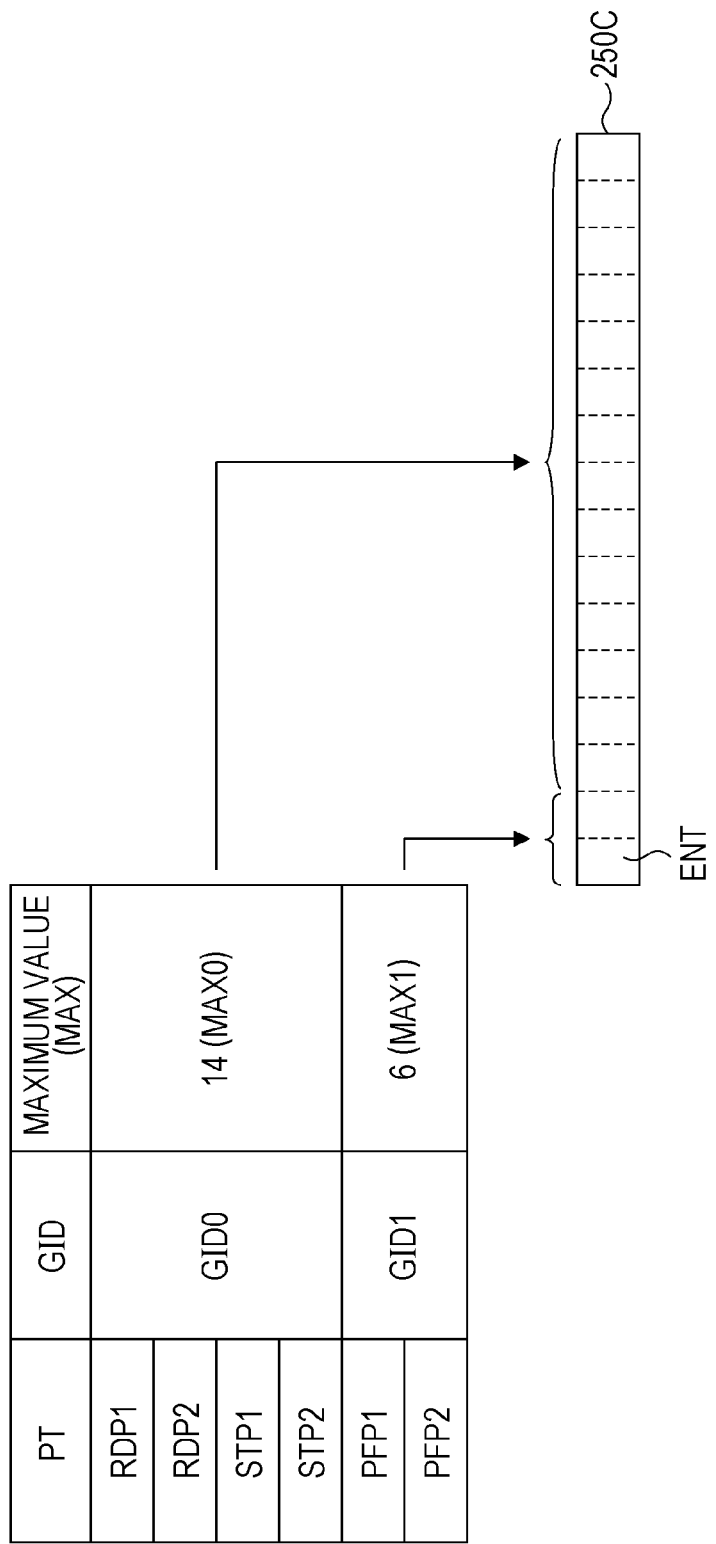
FIG. 14 illustrates an example of entry allocation in the buffer unit illustrated in FIG. 13.

FIG. 14 illustrates an example of entry ENT allocation in the buffer unit 250E illustrated in FIG. 5. In this embodiment, group identifiers GID (GID0 and GID1) are each allocated to multiple ports PT (RDP1, RDP2, STP1, and STP2, for example), and maximum values MAX for the number of reservable entries ENT are determined.

For example, the group identifier GID0 is allocated to the ports RDP1 and RDP2 in which are stored load commands (one access type), as well as the ports STP1 and STP2 in which are stored store commands (another access type). The group identifier GID1 is allocated to the ports PFP1 and PFP2 in which are stored prefetch commands (another access type). Load commands and store commands are types of commands that input data into, and output data from, data caches in L1 cache memory. Prefetch commands are a type of command that input programs into a command cache in L1 cache memory.

The maximum value MAX for the number of reservable entries ENT shared by the ports RDP1, RDP2, STP1, and STP2 identified by the group identifier GID0 is set to 14, for example. The maximum value MAX for the number of reservable entries ENT shared by the ports PFP1 and PFP2 identified by the group identifier GID1 is set to 6, for example.

The maximum value MAX for the number of allocable entries ENT is set such that the maximum value for the number of allocable entries ENT corresponding to one group identifier GID (in this example, a maximum of 14) is less than the total number of entries ENT (in this example, 16). For this reason, the maximum value MAX for the number of entries ENT able to be reserved by the each of the group identifiers GID0 and GID1 may also be set to 15, for example.

Note that a case in which the multiple ports PT are identified by three or more group identifiers GID is also conceivable. In this case, the sum of the maximum values for the number of allocable entries ENT corresponding to the other group identifiers GID excepting one group identifier GID is less than the total number of entries ENT (in this example, 16).

In this embodiment, two entries ENT for the group identifier GID1 may be reserved according to arbitration by the arbitration unit 230C, even in the case where the maximum value of 14 entries ENT is reserved for the group identifier GID0, for example.

FIG. 15 illustrates an example of the buffer controller 240E illustrated in FIG. 13. Detailed description will be reduced or omitted for elements that are similar or identical to FIG. 8 and FIG. 12.

The hold circuit 241E includes holding units HOLD that hold maximum values MAX0 and MAX1 respectively corresponding to the each of the group identifiers GID0 and GID1. The count circuit 242E includes counters CNT3 respectively corresponding to each of the group identifiers GID0 and GID1. The compare circuit 243E includes comparers CMP respectively corresponding to each of the group identifiers GID0 and GID1. In addition, the buffer controller 240E includes output circuits OUT that output an assign signal ASGN (ASGN0 and ASGN1) for each of the group identifiers GID0 and GID1 on the basis of the determination result from each comparer CMP.

Similarly to FIG. 8, each holding unit HOLD includes ROM that stores a maximum value MAX, and outputs the stored value as a maximum value MAX (either MAX0 or MAX1). The maximum values MAX0 and MAX1 are output as a 4-bit and a 3-bit signal, respectively. Note that each holding unit HOLD may also include a register that rewritably holds a maximum value MAX.

The counters CNT3 are similar or identical circuits to the counters CNT1 illustrated in FIG. 8, except that the upper boundary on the counter value is the maximum value MAX held in the corresponding holding unit HOLD. For example, the counter CNT3 corresponding to the group identifier GID0 counts up "+1" in response to receiving a start signal START0, counts down "−1" in response to receiving an end signal END0, and outputs the counter value as a count value N0. The count value N0 is a value from "0" to "14" in correspondence with the maximum value of the signal MAX0 (14), and is expressed with 4 bits.

The start signal START0 is generated in the case where an entry ENT is reserved in correspondence with an access request REQ held in the port RDP1, RDP2, STP1, or STP2 identified by the group identifier GID0, on the basis of the assign signal ASGN0. The start signal START1 is generated in the case where an entry ENT is reserved in correspondence with an access request REQ held in the port PFP1 or PFP2 identified by the group identifier GID1, on the basis of the assign signal ASGN1.

The end signal END0 is generated in the case where data stored in an entry ENT is output to a core unit CORE and the L2 cache memory 270C in correspondence with an access request REQ held in the port RDP1, RDP2, STP1, or STP2 identified by the group identifier GID0. The end signal END1 is generated in the case where data stored in an entry ENT is output to a core unit CORE and the L2 cache memory 270C in correspondence with an access request REQ held in the port PFP1 or PFP2 identified by the group identifier GID1.

Operation of the comparers CMP is similar to the operation of the comparers CMP illustrated in FIG. 8. In other words, each comparer CMP outputs a low level in the case where the count value N output from a counter CNT3 matches the maximum value MAX from a holding unit HOLD, and outputs a high level in the case where the count value N output from a counter CNT3 is less than the maximum value MAX.

Operation of the output circuit OUT is similar to the operation of the output circuits OUT illustrated in FIG. 8. In other words, the output circuits OUT output a high level assign signal ASGN (ASGN0 and ASGN1) when there is a free entry ENT corresponding to a group identifier GID (EMP=H), and the number of reserved entries ENT is less than the maximum value MAX.

Thus, in this embodiment, a maximum value MAX is set for the number of allocable entries ENT, for each of multiple groups of ports PT that receive different types of access requests REQ (RDP1, RDP2, STP1, and STP2, for example). Thus, it is possible to increase the number of reservable entries ENT for each port PT compared to FIG. 7 and FIG. 11. As a result, it is possible to inhibit the occurrence of aborted access requests REQ, and lower the likelihood of the core units CORE hanging up due to such aborts compared to the related art.

Figure 16:
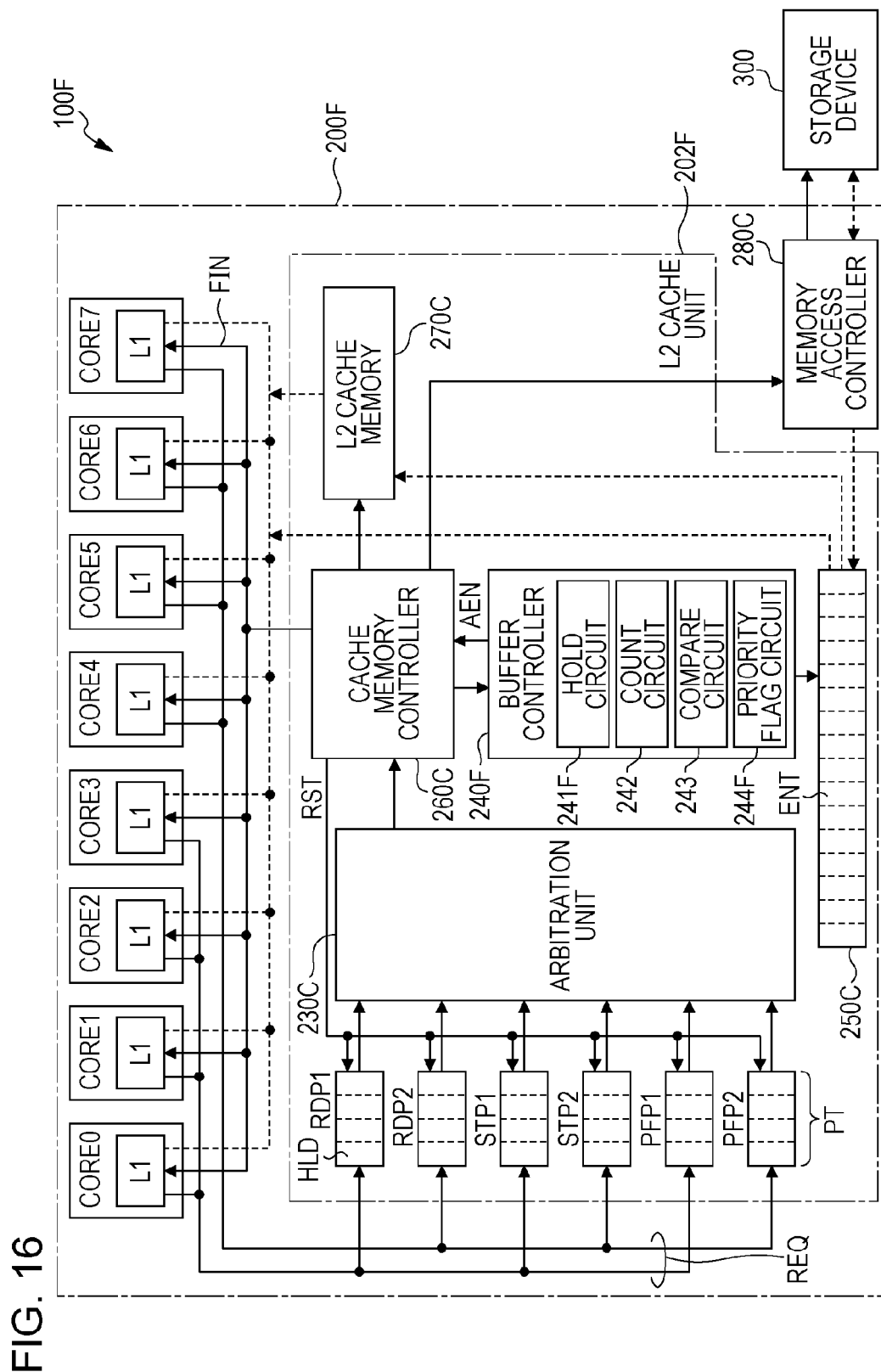
FIG. 16 illustrates an example of an information processing device and a computational processing device according to another embodiment.

FIG. 16 illustrates an example of an information processing device 100F and a computational processing device 200F according to another embodiment. Elements that are similar or identical to FIGS. 1, 2 and 5 are denoted with like signs, and detailed description of such elements will be reduced or omitted.

The information processing device 100F, the computational processing device 200F, and the L2 cache unit 202F include a buffer controller 240F instead of the buffer controller 240C illustrated in FIG. 5. The rest of the configuration of the information processing device 100F, the computational processing device 200F, and the L2 cache unit 202F is similar to the information processing device 100C, the computational processing device 200C, and the L2 cache unit 202C illustrated in FIG. 5. In other words, the information processing device 100F is a computing device such as a server or personal computer, while the computational processing device 200F is a processor such as a CPU.

Figure 17:
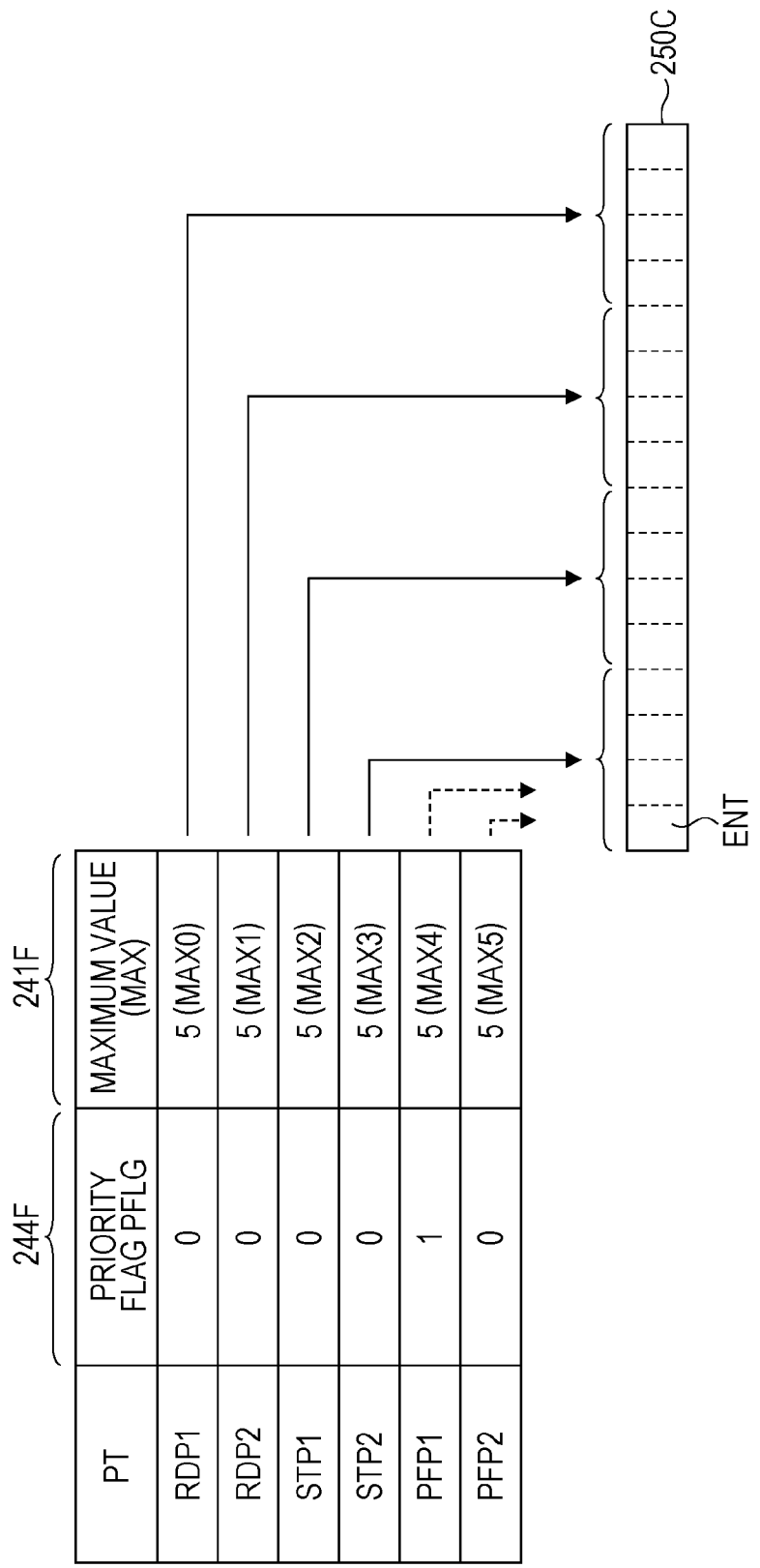
FIG. 17 illustrates an example of the priority flag circuit and hold circuit illustrated in FIG. 16, and an example of entry allocation by the buffer controller.

The buffer controller 240F includes a hold circuit 241F instead of the hold circuit 241 illustrated in FIG. 5, and newly includes a priority flag circuit 244F. FIG. 17 illustrates an example of the hold circuit 241F and the priority flag circuit 244F.

FIG. 17 illustrates an example of the priority flag circuit 244F and the hold circuit 241F illustrated in FIG. 16, and an example of entry allocation by the buffer controller 240F. Detailed description will be reduced or omitted for elements that are similar or identical to FIG. 7.

In this embodiment, the hold circuit 241F sets the maximum value MAX for the number of entries ENT reservable by the ports RDP1, RDP2, STP1, STP2, PFP1, and PFP2 to 5 each. The hold circuit 241F is similar to the hold circuit 241 illustrated in FIG. 5, except that the set maximum values MAX differ.

The sum of the maximum values MAX for the number of reservable entries ENT corresponding to the other ports PT excepting one port PT (in this example, 25) is set to be equal to or greater than the total number of entries ENT (in this example, 16). For this reason, entries ENT corresponding to the ports PFP1 and PFP2 are not reserved in the case where the ports RDP1, RDP2, STP1, and STP2 each have four entries ENT reserved, for example.

In this embodiment, it is possible to use the priority flag circuit 244F to reserve entries ENT for each port PT, even in the case where the sum of the maximum numbers of entries ENT reservable for the ports PT excepting one port PT is equal to or greater than the total number of entries ENT. The priority flag circuit 244F includes a priority flag PFLG for each of the ports RDP1, RDP2, STP1, STP2, PFP1, and PFP2. In other words, a priority flag PFLG is provided for each access type. A priority flag PFLG is set to "1", for example, for a port PT that has not reserved an entry ENT. However, the priority flag PFLG is settable in the case where all priority flag PFLG have been reset to "0".

In the case where one of the priority flags PFLG has been set, the buffer controller 240F reserves an entry ENT for the port PT corresponding to the set priority flag PFLG, and does not reserve entries ENT for the other ports PT.

For example, FIG. 17 illustrates a state in which the priority flag PFLG corresponding to the port PFP1 is set in the case where entries ENT have been reserved for the ports RDP1, RDP2, STP1, and STP2, and a free entry ENT does not exist. In this case, the buffer controller 240F aborts access requests REQ received from the arbitration unit 230C from all ports other than the port PFP1, and accepts an access request REQ from the port PFP1. Thus, in the case where an already reserved entry ENT becomes free as a result of retrieving data from the storage device 300, an entry ENT is newly reserved for the port PFP1 whose priority flag PFLG has been set.

Figure 18:
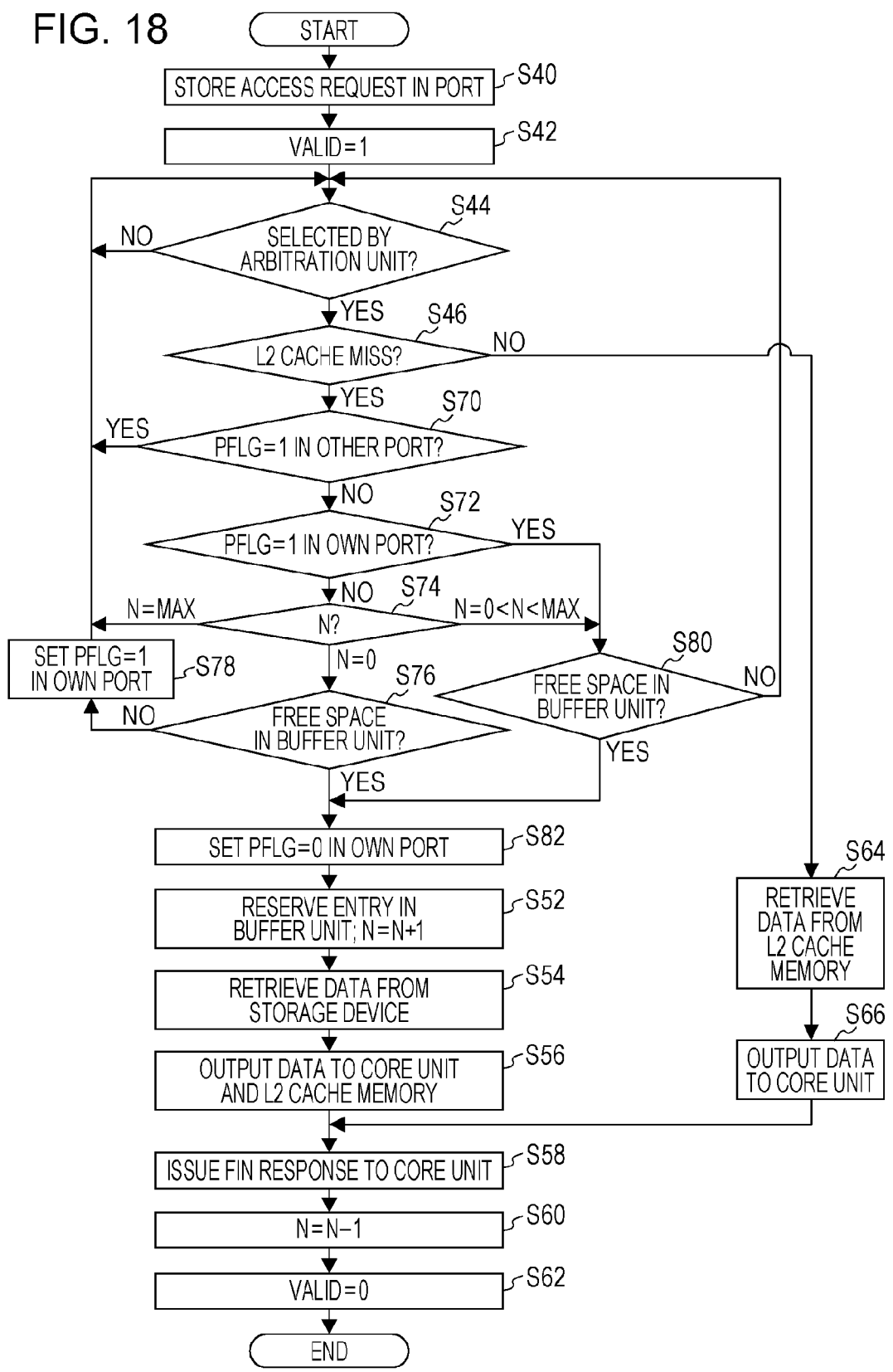
FIG. 18 illustrates exemplary operation of the L2 cache unit illustrated in FIG. 16.

FIG. 18 illustrates exemplary operation of the L2 cache section 202F illustrated in FIG. 16. Operations that are similar or identical to FIG. 9 are denoted with like signs, and detailed description of such operations will be reduced or omitted. The flow illustrated in FIG. 18 is realized in hardware, for example. Note that FIG. 18 illustrates the operation for an individual access request REQ and the operation of an individual port PT.

The operation of each core unit CORE is similar to FIG. 9. Note that the steps conducted by the L2 cache unit 202F illustrated in FIG. 18 are segmented in order to better demonstrate operation, but in actual practice, multiple steps may also be executed in parallel by the cooperative action of hardware in the L2 cache unit 202F.

In this embodiment, if a cache miss in the L2 cache memory 270C is determined in step S46, steps S70, S72, S74, S76, S78, S80, and S82 are executed instead of steps S48 and S50 illustrated in FIG. 9.

In step S70, it is determined whether or not a priority flag PFLG is set in correspondence with another port PT excepting the port PT holding the current access request REQ. In the case where a priority flag PFLG corresponding to another port PT is set, the process does not have the right to reserve an entry ENT for the current port PT, and thus returns to the determination in step S44.

In the case where a priority flag PFLG corresponding to another port PT is not set, in step S72 it is determined whether or not the corresponding priority flag PFLG is set for the current port PT holding the current access request REQ. In the case where the corresponding priority flag PFLG is set for the current port PT, a priority reservation for an entry ENT has already been made, and thus the process proceeds to the determination in step S80. In the case where the corresponding priority flag PFLG is not set for the current port PT, the process proceeds to the determination in step S74.

In step S74, it is determined whether or not an entry ENT has been reserved for the current port PT. In the case where a entry ENT has not been reserved for the current port PT (N=0), the process proceeds to the determination in step S76. In the case where the number of entries ENT reserved for the current port PT is equal to or greater than 1 but less than the maximum value MAX (N=0<N<MAX), the process proceeds to the determination in step S80. In the case where a number of entries ENT equal to the maximum value MAX have been reserved for the current port PT (N=MAX), the reservation of an additional entry ENT is not allowed, and thus the process returns to the determination in step S44.

In step S76, it is determined whether or not a free entry ENT exists in the buffer unit 250C. In the case where a free entry ENT exists in the buffer unit 250C, an entry ENT is reservable without setting a priority flag PFLG, and thus the process proceeds to the operation in step S82. In the case where a free entry ENT does not exist in the buffer unit 250C, in step S78 the priority flag PFLG corresponding to the current port PT is set. Thus, the buffer controller 240F will proceed to the processing in step S80 from the subsequent determination in step S72.

Note that step S78 is executed in the case where a priority flag PFLG is not set for another port PT in step S70. Thus, in the priority flag circuit 244F, it is possible to set one priority flag PFLG, and competition to reserve an entry ENT among multiple ports PT does not occur.

In addition, step S78 is executed in the case where an entry ENT corresponding to the current port PT is not set in step S74. Thus, the priority flag PFLG corresponding to the current port is not set in the case where at least entry ENT has been reserved for the current port.

In step S80, it is determined whether or not a free entry ENT exists in the buffer unit 250C. In the case where a free entry ENT exists in the buffer unit 250C, in step S82 the priority flag PFLG corresponding to the current port PT is reset, and the process to the operation in step S52. Subsequently, operation similar to FIG. 9 is executed. In the case where a free entry ENT does not exist in the buffer unit 250C, the reservation of an additional entry ENT is not allowed, and thus the process proceeds to the determination in step S44.

Thus, in this embodiment, the buffer controller 240F includes priority flags PFLG that prioritize entry ENT reservation. Thus, it is possible to reserve at least one entry ENT for each port PT, even in the case where the sum of maximum values MAX for the number of entries ENT reservable by the remaining ports PT excepting one port PT is equal to or greater than the total number of entries ENT. In addition, it is possible to raise the maximum value MAX for the number of entries ENT reservable by each port PT compared to FIG. 7. As a result, it is possible to lower the likelihood of a specific access request REQ being continually aborted compared to the related art, and lower the likelihood of the core units CORE hanging up due to such aborts compared to the related art.

Note that the embodiment illustrated in FIGS. 16 to 18 may also be applied to the embodiment illustrated in FIGS. 10 to 12 and to the embodiment illustrated in FIGS. 13 to 15. In this case, the sum of the maximum values MAX for the number of reservable entries ENT for other access identifiers AID excepting one access identifier AID is set to be equal to or greater than the total number of entries ENT, for example. The L2 cache unit 202D then operates similarly to FIG. 18, and entry ENT reservation is prioritized by a priority flag PFLG for an access identifier AID for which an entry ENT is not reserved.

Alternatively, the sum of the maximum values MAX for the number of reservable entries ENT for other group identifiers GID excepting one group identifier GID is set to be equal to or greater than the total number of entries ENT. The L2 cache unit 202E then operates similarly to FIG. 18, and entry ENT reservation is prioritized by a priority flag PFLG for a group identifier GID for which an entry ENT is not reserved.

Figure 19:
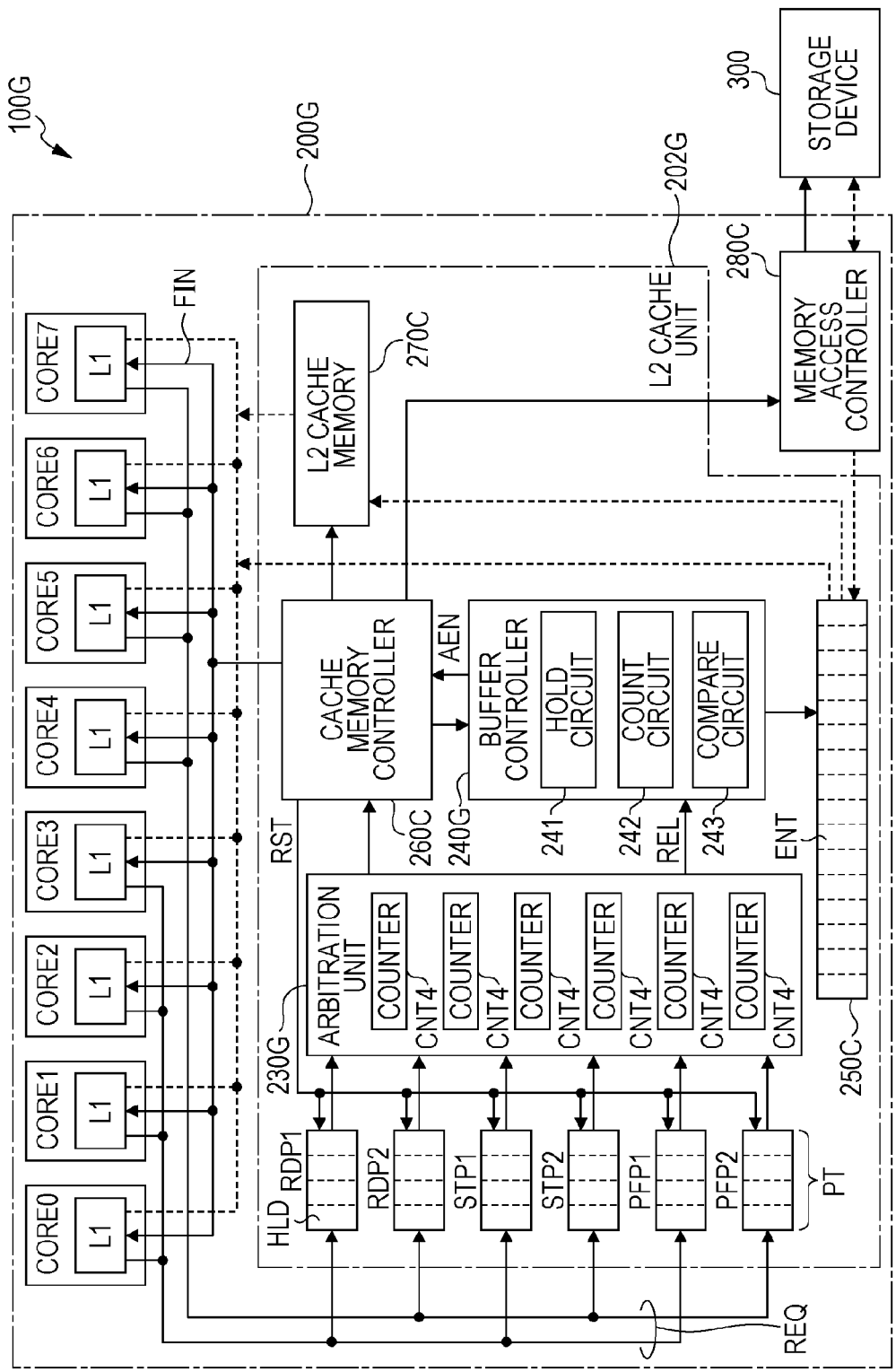
FIG. 19 illustrates an example of an information processing device and a computational processing device according to another embodiment.

FIG. 19 illustrates an example of an information processing device 100G and a computational processing device 200G according to another embodiment. Elements that are similar or identical to FIGS. 1, 2 and 5 are denoted with like signs, and detailed description of such elements will be reduced or omitted.

The information processing device 1000, the computational processing device 200G, and the L2 cache unit 202G include an arbitration unit 230G and a buffer controller 240G instead of the arbitration unit 230C and the buffer controller 240C illustrated in FIG. 5. The rest of the configuration of the information processing device 1000, the computational processing device 200G, and the L2 cache unit 202G is similar to the information processing device 100C, the computational processing device 200C, and the L2 cache unit 202C illustrated in FIG. 5. In other words, the information processing device 100G is a computing device such as a server or personal computer, while the computational processing device 200G is a processor such as a CPU.

The arbitration unit 230G adds a counter CNT4 corresponding to each port PT (RDP1, RDP2, STP1, STP2, PFP1, and PFP2) to the arbitration unit 230C illustrated in FIG. 5.

In other words, a counter CNT4 is provided for each access type. In the case of selecting an access request REQ held in one of the ports RDP1, RDP2, STP1, STP2, PFP1, and PFP2, the arbitration unit 230G resets the value of the corresponding counter CNT4. In the case where the selected port RDP1, RDP2, STP1, STP2, PFP1, or PFP2 is not holding an access request REQ, the arbitration unit 230G increments the value of the corresponding counter CNT4. Additionally, in the case where the values of the counters CNT4 corresponding to other ports PT are all "1" or greater, the arbitration unit 230G outputs to the buffer controller 240G a restriction release signal REL that releases a restriction on the number of allocable entries ENT. Thus, it becomes possible to reserve all entries ENT in the buffer unit 250C for a single port PT, for example.

Figure 20:
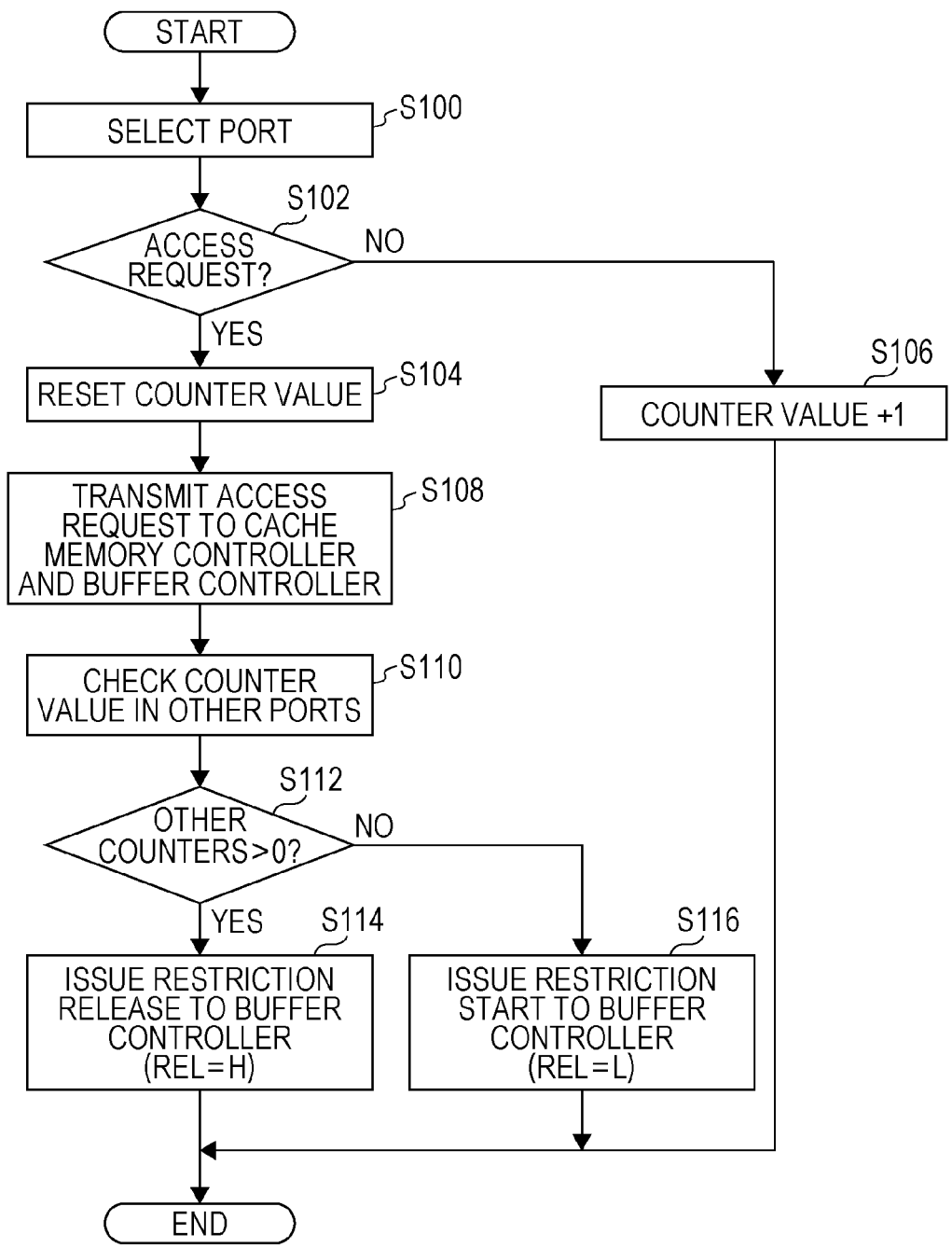
FIG. 20 illustrates exemplary operation of the arbitration unit illustrated in FIG. 19.

FIG. 20 illustrates exemplary operation of the arbitration unit 230G illustrated in FIG. 19. The operation illustrated in FIG. 20 corresponds to step S44 illustrated in FIG. 9, and is realized in hardware, for example. Note that FIG. 20 illustrates the operation for an individual access request REQ and the operation of an individual port PT.

First, in step S100 the arbitration unit 230G uses a technique such as round-robin to successively select one port PT (RDP1, RDP2, STP1, STP2, PFP1, or PFP2), for example. In step S102, the arbitration unit 230G determines whether or not the selected port PT is holding an access request REQ. If an access request REQ is being held, in step S104 the arbitration unit 230G resets the value of the counter CNT4 corresponding to the selected port PT, and proceeds to step S108. If an access request REQ is not being held, in step S106 the arbitration unit 230G increments (+1) the value of the counter CNT4 corresponding to the selected port PT, and the arbitration operation ends.

In step S108, the arbitration unit 230G outputs the selected access request REQ to the cache memory controller 260C and the buffer controller 240G. In step S110, the arbitration unit 230G checks the values of the counters CNT4 corresponding to the other ports PT excepting the selected port PT. In step S112, the process proceeds to step S114 in the case where the values of the counters CNT4 corresponding to the other ports PT are greater than "0", and proceeds to step S116 in the case where the values of the counters CNT4 corresponding to the other ports PT are reset to "0".

In step S114, the arbitration unit 230G outputs to the buffer controller 240G a notification that releases a restriction on the number of allocable entries ENT, and the arbitration process ends. In step S116, the arbitration unit 230G outputs to the buffer controller 240G a notification that starts a restriction on the number of allocable entries ENT, and the arbitration process ends. The release of the restriction on the allocable number is issued with a high level restriction release signal REL, while the start of the restriction on the allocable number is issued with a low level restriction release signal REL, for example.

Figure 21:
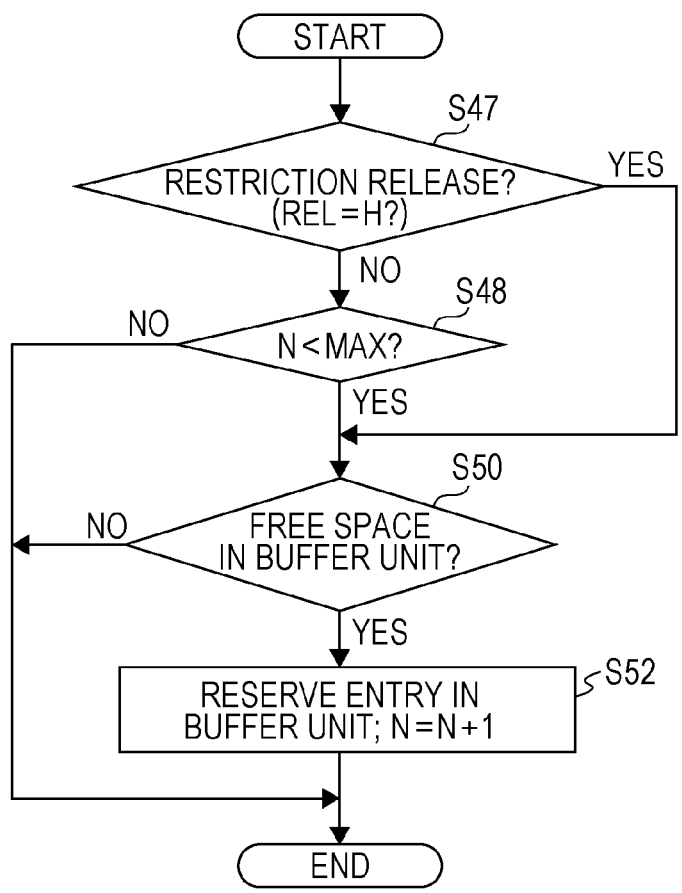
FIG. 21 illustrates exemplary operation of the buffer controller illustrated in FIG. 19.

FIG. 21 illustrates exemplary operation of the buffer controller 240G illustrated in FIG. 19. The operation illustrated in FIG. 21 corresponds to steps S48, S50, and S52 illustrated in FIG. 9, and is realized in hardware, for example. In other words, in this embodiment, a step S47 is inserted between step S46 and step S48 illustrated in FIG. 9. Other operation of the buffer controller 240G is similar to the operation of the buffer controller 240C illustrated in FIG. 9. Note that FIG. 21 illustrates the operation for an individual access request REQ and an individual port PT.

In step S47, the buffer controller 240G determines, on the basis of the logical level of the restriction release signal REL, whether or not a notification to release the restriction on the number of allocable entries ENT has been received from the arbitration unit 230G. In the case where a notification to release the restriction has been received (REL=H), the buffer controller 240G forbids the compare operation between the number N of entries ENT and the maximum value MAX in step S48, and executes the determination in step S50. In other words, if a free entry ENT exists in the buffer unit 250C, an entry is reserved, irrespective of the number of already-reserved entries ENT. On the other hand, in the case where a notification to release the restriction on the number of allocable entries ENT has not been received from the arbitration unit 230G (REL=L), the compare operation between the number N of entries ENT and the maximum value MAX is executed in step S48, similarly to FIG. 9.

Note that instead of the counters CNT4, the arbitration unit 230G illustrated in FIG. 19 may also include an idle flag indicating the presence of an access request REQ in correspondence with each of the ports RDP1, RDP2, STP1, STP2, PFP1, and PFP2. In other words, an idle flag is provided for each access type. In this case, if an access request REQ exists, the idle flag is reset in step S104 of FIG. 20, whereas if an access request REQ does not exist, the idle flag is set in step S106. Subsequently, in step S112 the process proceeds to step S114 in the case where the idle flags corresponding to the other ports PT have been set, and proceeds to step S116 in the case where the idle flags corresponding to the other ports PT are reset.

Note that in the counters CNT4 illustrated in FIG. 19, a value equal to or greater than "1" indicates that the above idle flag is in a set state, while a value of "0" indicates that the idle flag is in a reset state.

Thus, in the foregoing embodiment, it is likewise possible to reserve at least one entry ENT for each of the ports RDP1, RDP2, STP1, STP2, PFP1, and PFP2, similarly to the embodiments illustrated in FIGS. 1 to 9. Furthermore, in this embodiment, the restriction on the number of reservable entries ENT according to the maximum value MAX is released in the case where access requests are being produced in concentration on a specific port PT, while not being produced for other ports PT. Thus, it is possible to increase the number of reservable entries ENT for the port PT where access requests are concentrated to the maximum number of entries ENT included in the buffer unit 250C (in this example, 16). As a result, it is possible to lower the likelihood of access requests REQ being continually aborted compared to the related art, and lower the likelihood of the core units CORE hanging up due to such aborts compared to the related art.

Note that the embodiment illustrated in FIGS. 19 to 21 may also be applied to the embodiment illustrated in FIGS. 10 to 12 and to the embodiment illustrated in FIGS. 13 to 15. In this case, the arbitration unit 230G includes a counter CNT4 in correspondence with each access identifier AID, for example. The restriction on the number of reservable entries ENT according to the maximum value MAX is then released in the case where access requests are being produced in concentration on a specific access identifier AID, while not being produced for other access identifiers AID.

Alternatively, the arbitration unit 230G includes a counter CNT4 in correspondence with each group identifier GID. The restriction on the number of reservable entries ENT according to the maximum value MAX is then released in the case where access requests are being produced in concentration on a specific group identifier GID, while not being produced for the other group identifier GID.

Figure 22:
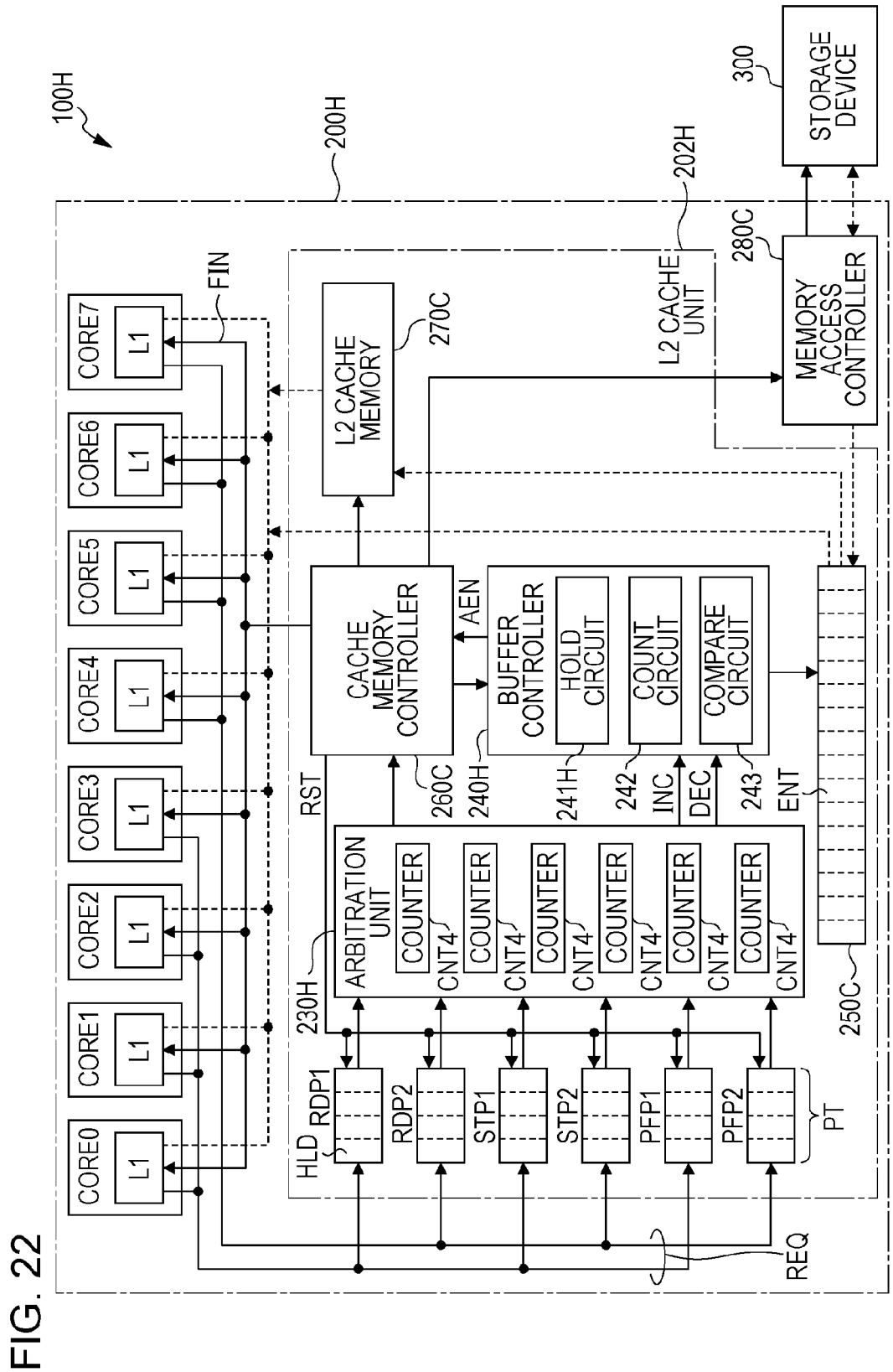
FIG. 22 illustrates an example of an information processing device and a computational processing device according to another embodiment.

FIG. 22 illustrates an example of an information processing device 100H and a computational processing device 200H according to another embodiment. Elements that are similar or identical to FIGS. 1, 2, 5, and 19 are denoted with like signs, and detailed description of such elements will be reduced or omitted.

The information processing device 100H, the computational processing device 200H, and the L2 cache unit 202H include an arbitration unit 230H and a buffer controller 240H instead of the arbitration unit 230C and the buffer controller 240C illustrated in FIG. 5. The rest of the configuration of the information processing device 100H, the computational processing device 200H, and the L2 cache unit 202H is similar to the information processing device 100C, the computational processing device 200C, and the L2 cache unit 202C illustrated in FIG. 5. In other words, the information processing device 100H is a computing device such as a server or personal computer, while the computational processing device 200H is a processor such as a CPU.

Similarly to the arbitration unit 230G illustrated in FIG. 19, the arbitration unit 230H adds a counter CNT4 corresponding to each port PT (RDP1, RDP2, STP1, STP2, PFP1, and PFP2) to the arbitration unit 230C illustrated in FIG. 5. In other words, a counter CNT4 is provided for each access type.

The arbitration unit 230H uses a technique such as round-robin, for example, to successively select one port PT. In the case where the selected port PT is holding an access request REQ, the arbitration unit 230H increments the value of the corresponding counter CNT4. Also, in the case where the selected port PT is not holding an access request REQ, the arbitration unit 230H decrements the value of the corresponding counter CNT4. For example, a counter CNT4 value of "10" indicates a higher frequency of access requests REQ compared to a counter CNT4 value of "5".

Furthermore, in the case where an incremented counter CNT4 value reaches a multiple of 5, for example, the arbitration unit 230H outputs a increment signal INC to the buffer controller 240H. In the case where an decremented counter CNT4 value reaches a multiple of 5, for example, the arbitration unit 230H outputs a decrement signal DEC to the buffer controller 240H. Note that an increment signal INC and a decrement signal DEC are generated for every port PT corresponding to a counter CNT4.

The buffer controller 240H includes a hold circuit 241H instead of the hold circuit 241 illustrated in FIG. 5. Similarly to FIG. 8, the hold circuit 241H includes holding units HOLD that hold a maximum value MAX for each of the ports RDP1, RDP2, STP1, STP2, PFP1, and PFP2. However, the holding units HOLD are registers able to rewrite held values, for example.

The buffer controller 240H increases by "1" the value of a corresponding holding unit HOLD on the basis of the increment signal INC, and decreases by "1" by value of a corresponding holding unit HOLD on the basis of the decrement signal DEC. Other functions of the buffer controller 240H are similar to the functions of the buffer controller 240C illustrated in FIG. 5. Note that in this embodiment, 3 is the maximum value for the number of allocable entries ENT able to be set in each of six holding units HOLD with respect to 16 entries ENT, similarly to FIG. 7. In other words, each holding unit HOLD holds a value of "0", "1", "2", or "3", with the sum of maximum values for the number of allocable entries ENT corresponding to other ports PT excepting one port PT being set to less than the total number of entries ENT. "3" is the maximum value for a value increased on the basis of the increment signal INC, while "0" is the minimum value for a value decreased on the basis of the decrement signal DEC.

Figure 23:
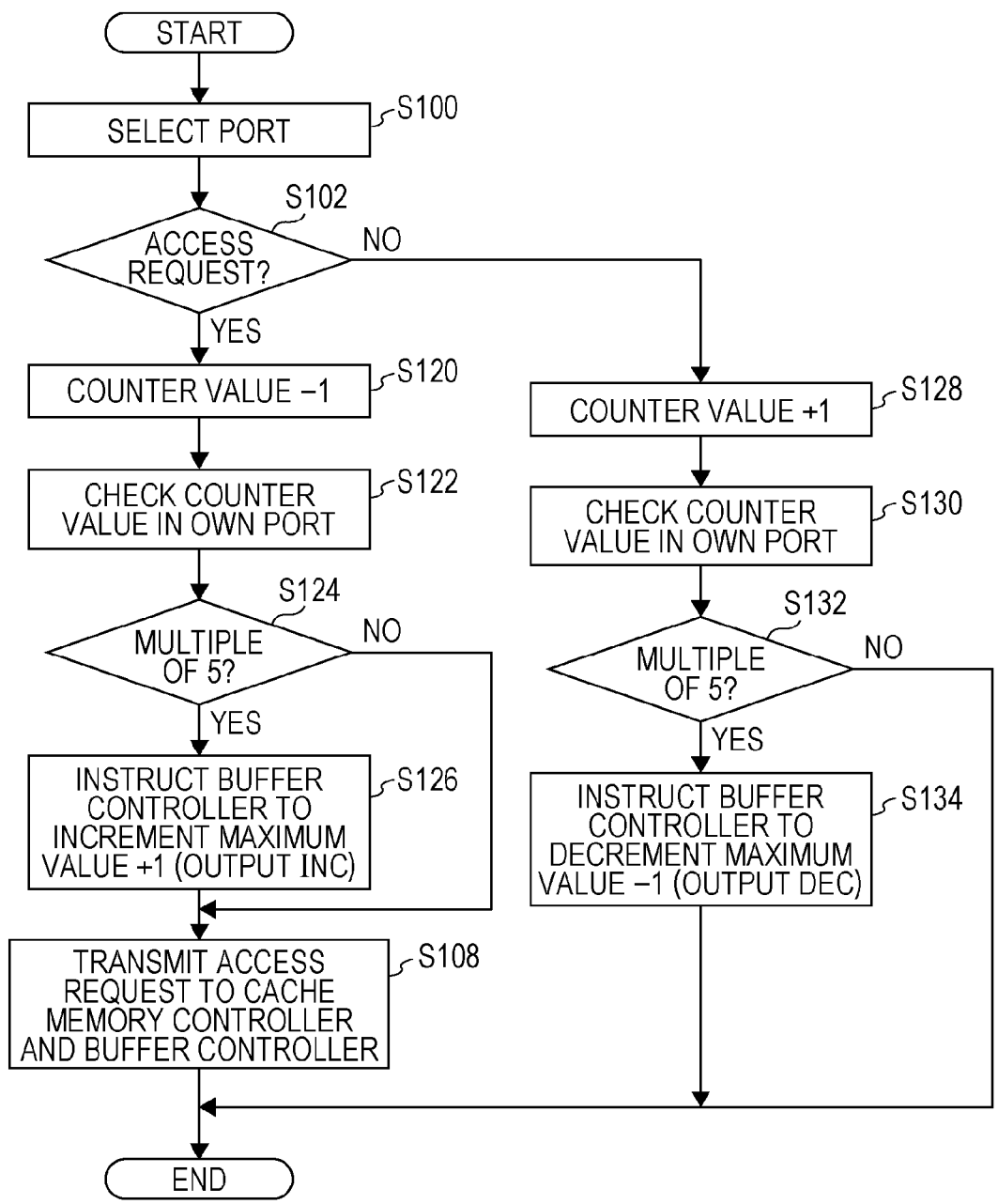
FIG. 23 illustrates exemplary operation of the arbitration unit illustrated in FIG. 22.

FIG. 23 illustrates exemplary operation of the arbitration unit 230H illustrated in FIG. 22. Elements that are similar or identical to FIGS. 9 and 20 are denoted with like signs, and detailed description of such elements will be reduced or omitted. The operations illustrated in FIG. 23 are realized in hardware, for example. Note that FIG. 23 illustrates the operation for an individual access request REQ and the operation of an individual port PT.

The operations in steps S100 and S102 are similar to the operations in steps S100 and S102 illustrated in FIG. 20. In the case where the selected port PT is holding an access request REQ, in step S120 the arbitration unit 230H receives the access request REQ and decreases the value of the corresponding counter CNT4 by "1". In other words, the counter CNT4 is counted in one direction on the basis of receiving access requests REQ. Next, in step S122 the arbitration unit 230H checks the values of the counter CNT4 corresponding to the current port PT (that is, the selected port PT). In step S124, the arbitration unit 230H determines whether or not the value of the counter CNT4 has decreased to a multiple of 5. Note that the multiple of 5 is an example, and may be a multiple of a natural number equal to or greater than 2.

In the case where the value of the counter CNT4 has decreased to a multiple of 5, in step S126 the arbitration unit 230H outputs an increment signal INC to the buffer controller 240H to increase the value in the corresponding holding unit HOLD (that is, the maximum value MAX). After that, in step S108 the arbitration unit 230H outputs the selected access request REQ to the cache memory controller 260C and the buffer controller 240H, similarly to step S108 in FIG. 20.

Meanwhile, in the case where the selected port PT is not holding an access request REQ, in step S128 the arbitration unit 230H increases the value of the corresponding counter CNT4 by "1". In other words, the counter CNT4 is counted in the opposite direction when an access request REQ is not being held. Next, in step S130 the arbitration unit 230H checks the values of the counter CNT4 corresponding to the current port PT (that is, the selected port PT). In step S132, the arbitration unit 230H determines whether or not the value of the counter CNT4 has increased to a multiple of 5. Note that the multiple of 5 is an example, and may be multiple of another natural number. In this case, the value to compare is preferably the same value as in step S124.

In the case where the value of the counter CNT4 has increased to a multiple of 5, in step S34 the arbitration unit 230H outputs a decrement signal DEC to the buffer controller 240H to decrease the value in the corresponding holding unit HOLD (that is, the maximum value MAX). The arbitration operations are then completed.

Figure 24:
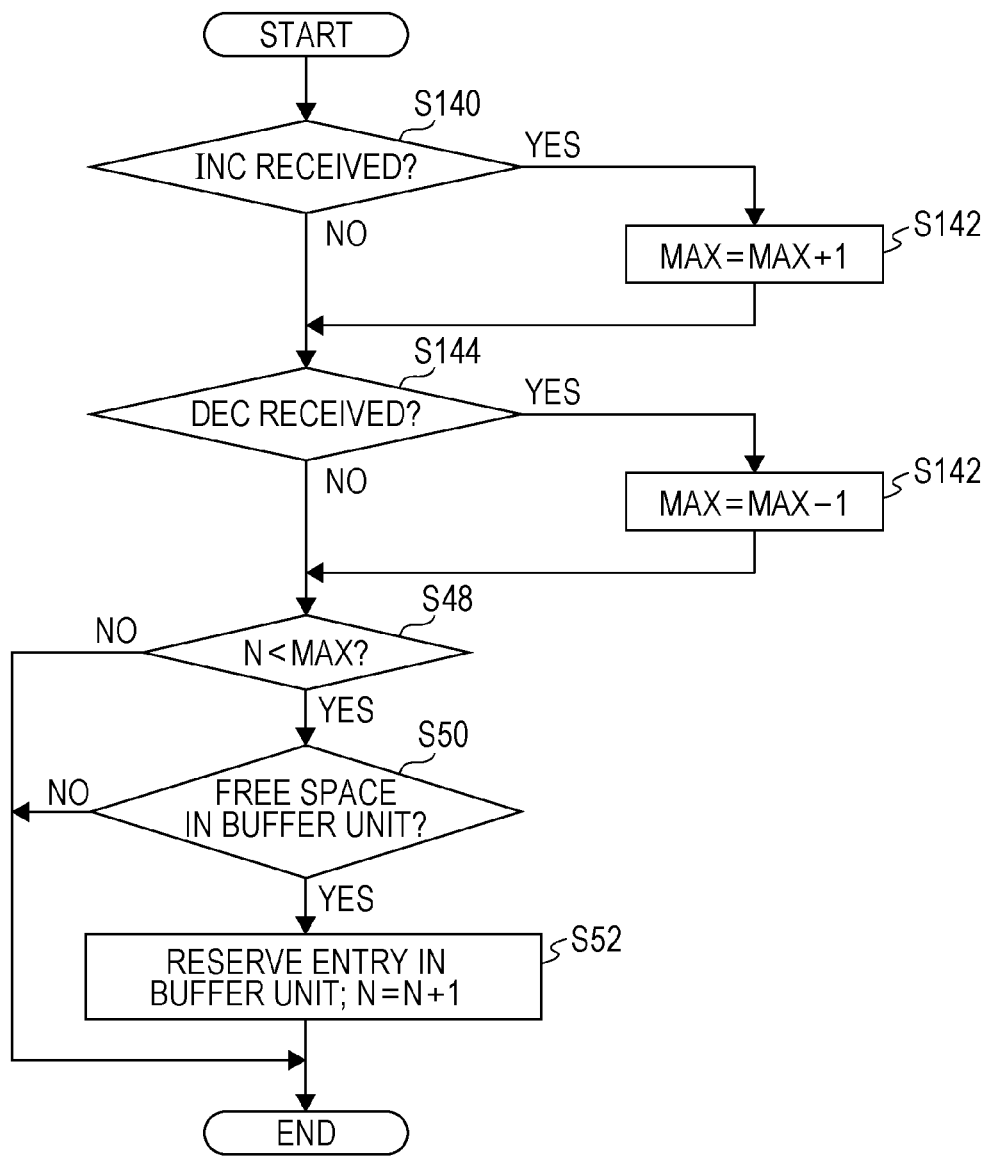
FIG. 24 illustrates exemplary operation of the buffer controller illustrated in FIG. 22.

FIG. 24 illustrates exemplary operation of the buffer controller 240H illustrated in FIG. 22. The operations illustrated in FIG. 24 correspond to steps S48, S50, and S52 illustrated in FIG. 9, and are realized in hardware, for example. In other words, in this embodiment, steps S140, S142, S144, and S146 are inserted between step S46 and step S48 illustrated in FIG. 9. Other operations of the buffer controller 240H are similar to the operations of the buffer controller 240C illustrated in FIG. 9. Note that FIG. 24 illustrates the operation for an individual access request REQ and the operation of an individual port PT.

In step S140, the buffer controller 240H determines whether or not an increment signal INC has been received from the arbitration unit 230H. If an increment signal INC has been received, in step S142 the buffer controller 240H increases the maximum value MAX held in the corresponding holding unit HOLD by "1". In other words, the buffer controller 240H increases the corresponding maximum value MAX in the case where the counter CNT4 is counted a given number in one direction (in this example, decreased by "5"). However, the maximum value MAX is held in the case where the maximum value MAX is already set to "3".

In step S144, the buffer controller 240H determines whether or not a decrement signal DEC has been received from the arbitration unit 230H. If a decrement signal DEC has been received, in step S146 the buffer controller 240H decreases the maximum value MAX held in the corresponding holding unit HOLD by "1". In other words, the buffer controller 240H decreases the corresponding maximum value MAX in the case where the counter CNT4 is counted a given number in the opposite direction (in this example, increased by "5"). However, the maximum value MAX is held in the case where the maximum value MAX is already set to "0".

After that, the operations in steps S48, S50, and S52 are executed, similarly to FIG. 9. Note that in step S48, the number N of reserved entries ENT is compared to a maximum value MAX set to "0", "1", "2", or "3".

Thus, in the foregoing embodiment, it is likewise possible to reserve at least one entry ENT for each port PT (RDP1, RDP2, STP1, STP2, PFP1, and PFP2), similarly to the embodiments illustrated in FIGS. 1 to 9. Furthermore, in this embodiment, the upper limit on the number of reservable entries ENT (that is, the maximum value MAX) is modified to match changes in the frequency of access requests on each port PT. Thus, it is possible to decrease the upper limit on the number of reservable entries ENT according to the frequency of issued access requests. As a result, it is possible to lower the likelihood of access requests REQ being continually aborted compared to the related art, and lower the likelihood of the core units CORE hanging up due to such aborts compared to the related art.

Note that in the embodiment illustrated in FIGS. 22 to 24, the sum of maximum values for the number of allocable entries ENT corresponding to other ports PT excepting one port PT is set to less than the total number of entries ENT. However, the sum of maximum values for the number of allocable entries ENT corresponding to other ports PT excepting one port PT may also be set equal to or greater than the total number of entries ENT. In this case, the buffer controller 240H includes a priority flag circuit 244F having a priority flag PFLG corresponding to each port PT, as illustrated in FIG. 17, and the L2 cache unit 202H executes the operations illustrated in FIG. 18. The flow illustrated in FIG. 23 is included in step S44 of FIG. 18. Steps S140, S142, S144, and S146 of the flow illustrated in FIG. 24 are inserted between steps S72 and S74 of FIG. 18. Thus, it is possible to use the priority flag PFLG to reserve an entry ENT, even in the case where increasing the maximum values MAX has caused the sum of maximum values MAX for the number of entries ENT reservable by the remaining ports PT excepting one port PT to become equal to or greater than the total number of entries ENT.

Furthermore, the embodiment illustrated in FIGS. 22 to 24 may also be applied to the embodiment illustrated in FIGS. 10 to 12 and to the embodiment illustrated in FIGS. 13 to 15. In this case, the arbitration unit 230G includes a counter CNT4 in correspondence with each access identifier AID, for example. The maximum value MAX is then increased for each access identifier AID in the case where the frequency of access requests REQ rises, and the maximum value MAX is decreased for each access identifier AID in the case where the frequency of access requests REQ lowers.

Alternatively, the arbitration unit 230G includes a counter CNT4 in correspondence with each group identifier GID. The maximum value MAX is then increased for each group identifier GID in the case where the frequency of access requests REQ rises, and the maximum value MAX is decreased for each group identifier GID in the case where the frequency of access requests REQ lowers.

Note that the embodiments illustrated in FIG. 1 to FIG. 24 describe examples in which the storage device 300 is possessed by the computational processing device 200, 200A, 200C, 200D, 200E, 200F, 200G, 200H, or the like. However, the storage device may also be shared among multiple computational processing devices. In this case, the embodiments illustrated in FIG. 1 to FIG. 24 may be applied to each computational processing device.

In addition, in the case where the information processing devices 100C, 100D, 100E, 100F, 100G, and 100H include an L3 cache unit, the embodiments illustrated in FIG. 5 to FIG. 24 may be applied to at least one of the L2 cache unit and the L3 cache unit. For example, in the case of applying the embodiment illustrated in FIG. 5 to an L3 cache unit, the L3 cache unit is disposed between the L2 cache unit 202C and the memory access controller 280C. The cache memory controller 260C then outputs an access request REQ to the L3 cache unit when a cache miss occurs in the L2 cache memory. The L3 cache unit receives the access request REQ from the cache memory controller 260C, and determines a cache hit or a cache miss in the L3 cache memory. The L3 cache unit then outputs an access request REQ to the memory access controller 280C when a cache miss occurs.

The foregoing detailed description clarifies the features and advantages of the embodiments, and the claims are intended to extend to the features and advantages of embodiments like those discussed above without departing from the scope and spirit thereof. Furthermore, although various alterations and modifications may easily occur to persons ordinarily skilled in the art, the scope of embodiments having inventiveness is not intended to be limited to that discussed above, but may also be based on suitable alterations and their equivalents included in the scope disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computational processing device comprising:
   a computational processor coupled to a storage device;
   a plurality of request holding units, each of the plurality of request holding units provided for each different type of commands for accessing the storage device, that hold, independently with each other, the respective commands output from the computational processor, the plurality of request holding units including a first request holding unit configured to hold a prefetch command and a second request holding unit configured to hold an access command type other than the prefetch command; and a buffer unit that includes a plurality of entries for holding data from the storage device, wherein the computational processing device arbitrates the commands in the plurality of request holding units and causes one of the plurality of entries to hold data output by the storage device in response to an arbitration result, on the basis of a result of comparing a number of first entries for each type of the commands, from among the plurality of entries, holding data obtained from the storage device for each type of the commands with a maximum value for each type of the commands.

2. The computational processing device according to claim 1, wherein the computational processing device causes one of the plurality of entries to hold data output by the storage device in response to the arbitration result in the case where the number of first entries is less than the maximum value.

3. The computational processing device according to claim 1, wherein the computational processing device does not cause one of the plurality of entries to hold data output by the storage device in response to the arbitration result in the case where the number of first entries is the maximum value.

4. The computational processing device according to claim 1, wherein a sum of the maximum value for each type of the commands is set to less than a total number of the plurality of entries.

5. The computational processing device according to claim 1, wherein the computational processing device includes a hold circuit that holds the maximum value for each type of commands, a count circuit that computes the number of first entries, and a compare circuit that compares the number of first entries with the maximum value.

6. The computational processing device according to claim 1, wherein access identifiers are assigned to each of the plurality of request holding units respectively, wherein the computational processing device causes one of the plurality of entries to hold data output by the storage device in response to the arbitration result, on the basis of a result of comparing the number of first entries, from among the plurality of entries, holding data obtained from the storage device for a command corresponding to each of the access identifiers with a maximum value for each of the access identifiers.

7. The computational processing device according to claim 6, wherein a sum of the maximum value for each of the access identifiers other than one of the access identifiers is set to less than a total number of plurality of entries.

8. The computational processing device according to claim 6, wherein the computational processing device includes a hold circuit that holds the maximum value, a count circuit that computes the number of first entries, and a compare circuit that compares the number of first entries with the maximum value for each of the access identifiers.

9. The computational processing device according to claim 1, wherein group identifiers corresponding to a plurality of access types are assigned to each of the plurality of request holding units respectively, wherein the computational processing device causes one of the plurality of entries to hold data output by the storage device in response to the arbitration result, on the basis of a result of comparing the number of first entries, from among the plurality of entries, holding data obtained from the storage device for a command corresponding to each of the group identifiers with a maximum value for each of the group identifiers.

10. The computational processing device according to claim 9, wherein a sum of the maximum value for each of the group identifiers other than one of the group identifiers is set to less than a total number of the plurality of entries.

11. The computational processing device according to claim 9, wherein the computational processing device includes a hold circuit that holds the maximum value for each of the group identifiers, a count circuit that computes the number of first entries, and a compare circuit that compares the number of first entries with to the maximum value for each of the group identifiers.

12. The computational processing device according to claim 1, wherein the computational processing device includes, for each type of the commands, a priority flag set in the case of prioritizing a command, in the case where an entry reserved in correspondence with one type of the commands with the priority flag set does not exist, suspends the reservation of entries based on a command of the other type of the commands, and reserves an entry on the basis of the one type of commands, and a sum of the maximum values for each type of the commands other than one of the commands is set equal to or greater than a total number of the plurality of entries.

13. The computational processing device according to claim 1, wherein the computational processing device includes, for each type of commands, an idle flag which are reset on the basis of receiving a command held selected one of the plurality of request holding units, and are set in the case where the command is not being held in the selected one of the plurality of request holding units, and, in the case where the idle flag corresponding one type of commands is reset and the idle flag corresponding to another type of commands is set, reserves an entry on the basis of a command corresponding to the reset idle flag.

14. The computational processing device according to claim 1, wherein the computational processing device includes, for each type of the commands, a counter counted in one direction on the basis of receiving a command held in selected one of the plurality of request holding units, and counted in the opposite direction in the case where the command is not being held in the selected one of the plurality of requested holding units, and increases the corresponding maximum value in the case where the counter is counted a given number in the one direction, and decreases the corresponding maximum value in the case where the counter is counted a given number in the opposite direction.

15. An information processing device comprising:
a storage device; and
a computational processing device connected to the storage device,
wherein the computational processing device includes:
a cache memory unit,
a computational processor,
a plurality of request holding units, each of the plurality of request holding units provided for each different type of commands for accessing the storage device, that hold, independently with each other, the respective commands output from the computational processor, the plurality of request holding units including a first request holding unit configured to hold a prefetch command and a second request holding unit configured to hold an access command other than the prefetch command, and a buffer unit that includes a plurality of entries for holding data from the storage device, wherein the computational processing device arbitrates in the plurality of request holding units, causes one of the plurality of entries to hold data output by the storage device in response to an arbitration result, on the basis of a result of comparing a number of first entries for each type of commands, from among the plurality of entries, holding data obtained from the storage device for each type of commands with a maximum value for each type of the commands, and outputs data held in the buffer unit to the cache memory unit.

16. A method of controlling an information processing device that includes a storage device and a computational processing device connected to the storage device, the method comprising:

holding by a plurality of request holding units, each of the plurality of request holding units provided for each different type of commands for accessing the storage device in the computational processing device, independently with each other, respective commands output from a computational processor in the computational processing device, the plurality of request holding units including a first request holding unit configured to hold a prefetch command and a second request holding unit configured to hold an access command other than the prefetch command;

arbitrating the commands held in the plurality of request holding units;

holding data output by the storage device in response to an arbitration result in a buffer unit that includes a plurality of entries, on the basis of a result of comparing a number of entries holding data from among the plurality of entries holding data obtained from the storage device for each type of the commands with a maximum value for each of the commands; and outputting the data in the buffer unit to a cache memory unit.

17. The computational processing device according to claim 1, wherein the access command other than the prefetch command is one of a store command and a load command.

18. The information processing device according to claim 15, wherein the access command other than the prefetch command is one of a store command and a load command.

19. The method according to claim 16, wherein the access command other than the prefetch command is one of a store command and a load command.

* * * * *